United States Patent
Böhm

(10) Patent No.: US 11,023,809 B2
(45) Date of Patent: Jun. 1, 2021

(54) CAPACITY PREDICTION FOR PUBLIC TRANSPORT VEHICLES

(71) Applicant: Gerrit Böhm, Geretsried (DE)

(72) Inventor: Gerrit Böhm, Geretsried (DE)

( * ) Notice: Subject to any disclaimer, the term of this patent is extended or adjusted under 35 U.S.C. 154(b) by 118 days.

(21) Appl. No.: 15/326,202

(22) PCT Filed: Jul. 13, 2015

(86) PCT No.: PCT/EP2015/001438
§ 371 (c)(1),
(2) Date: Jan. 13, 2017

(87) PCT Pub. No.: WO2016/008580
PCT Pub. Date: Jan. 21, 2016

(65) Prior Publication Data
US 2017/0200082 A1  Jul. 13, 2017

(30) Foreign Application Priority Data

Jul. 14, 2014 (EP) ..................... 14002426

(51) Int. Cl.
*G06N 5/02* (2006.01)
*H04W 4/42* (2018.01)
(Continued)

(52) U.S. Cl.
CPC ............ *G06N 5/022* (2013.01); *G06Q 10/06* (2013.01); *G06Q 50/30* (2013.01); *H04W 4/42* (2018.02); *G06Q 2240/00* (2013.01)

(58) Field of Classification Search
CPC ......... G06N 5/022; G06Q 10/06; G06Q 50/30
(Continued)

(56) References Cited

U.S. PATENT DOCUMENTS 5,485,347 A * 1/1996 Miura ................... G06M 1/101
104/28
6,374,176 B1 * 4/2002 Schmier ................. G08G 1/123
340/988

(Continued)

FOREIGN PATENT DOCUMENTS

CN  103049797 A    4/2013
CN  103714391   * 10/2013  ............... G06N 5/04
(Continued)

OTHER PUBLICATIONS

Yang, Tao. "Clustering method for counting passengers getting in a bus with single camera". Published Mar. 1, 2010. https://www.spiedigitallibrary.org/journals/optical-engineering/volume-49/issue-3/037203/Clustering-method-for-counting-passengers-getting-in-a-bus (Year: 2010).*

(Continued)

*Primary Examiner* — George Chen
*Assistant Examiner* — Lisa Ma
(74) *Attorney, Agent, or Firm* — Quarles & Brady LLP

(57) ABSTRACT

A method and a computerized system programmed to carry out the method of predicting the capacity of a public-transport vehicle for passengers to board at the stop and for displaying this predicted capacity on remote computer devices or service screens is provided. The method comprises a prediction process and a data procurement process. The capacity of the public-transport vehicle for passengers to board at the stop is predicted in the prediction process by combining measurements of a filling level of the public-transport vehicle when the public-transport vehicle is at the stop or approaching the stop, which are performed in the course of the data procurement process, with a number of passengers expected to alight the public-transport vehicle.

19 Claims, 15 Drawing Sheets

(51) Int. Cl.
 *G06Q 10/06* (2012.01)
 *G06Q 50/30* (2012.01)
(58) Field of Classification Search
 USPC .......................................................... 705/13
 See application file for complete search history.

(56) References Cited

U.S. PATENT DOCUMENTS

| | | | | |
|---|---|---|---|---|
| 6,919,804 | B1* | 7/2005 | Cook | G07C 9/00 340/541 |
| 2002/0099500 | A1 | 7/2002 | Schmier | |
| 2004/0066500 | A1* | 4/2004 | Gokturk | G01C 11/30 356/4.01 |
| 2004/0088104 | A1* | 5/2004 | Izbicki | G08G 1/123 701/117 |
| 2005/0111700 | A1* | 5/2005 | O'Boyle | B60R 21/01556 382/104 |
| 2008/0036580 | A1 | 2/2008 | Breed | |
| 2010/0017215 | A1 | 1/2010 | Nigam | |
| 2013/0268148 | A1 | 10/2013 | Kondo | |
| 2014/0375808 | A1* | 12/2014 | Kao | G06K 9/00838 348/148 |
| 2015/0106159 | A1* | 4/2015 | Hong | G06Q 50/26 705/7.29 |
| 2015/0241209 | A1* | 8/2015 | Jouper | G01B 17/00 702/156 |

FOREIGN PATENT DOCUMENTS

| | | |
|---|---|---|
| DE | 102011087039 A1 | 4/2013 |
| GB | 2508743 B | 6/2014 |
| JP | 2005186783 A | 7/2005 |
| JP | 2013025523 A | 2/2013 |
| WO | 1998008206 A2 | 2/1998 |
| WO | 2004045914 A1 | 6/2004 |
| WO | 2011/026098 A2 | 3/2011 |
| WO | 2012/034083 A2 | 3/2012 |
| WO | 2012086000 | 6/2012 |

OTHER PUBLICATIONS

International Search Report and Written Opinion from PCT/EP2015/001438, dated Oct. 9, 2015, 9 pages.
Johnson, M. et al. "Real-time baggage tracking using a modified background subtraction algorithm." 2012 19th International Conference on Mechatronics and Machine Vision in Practice (M2VIP). IEEE, 2012.
Zhang, Y., et al. "Real-time scalable depth sensing with hybrid structured light illumination." IEEE Transactions on Image Processing 23.1 (2013): 97-109.

\* cited by examiner

CAPACITY PREDICTION FOR PUBLIC TRANSPORT VEHICLES

CROSS-REFERENCE TO RELATED APPLICATIONS

This patent application is a U.S. 371 National Phase Entry of International Patent Application No.: PCT/EP2015/001438, filed on Jul. 13, 2015, which claims priority to European Patent Application No.: 14002423.6, filed on Jul. 14, 2014, each of which is incorporated by reference in its entirety as if fully set forth herein.

FIELD OF THE INVENTION

The invention relates to capacity prediction for public transport vehicles and, for example, to a method and a computerized system for predicting a capacity of a public-transport vehicle for passengers to board at a stop and for displaying information representative of this capacity.

BACKGROUND

Known forecasts in the field of transportation usually pertain to traffic jams and/or delays, however some ideas in the prior art are directed at passenger flow forecasts. In "Passenger Flows Estimation of Light Rail Transit (LRT) System in Izmir, Turkey Using Multiple Regression and ANN Methods", http://dx.doi.org/10.7307/ptt.v24i1.264, by Mustafa Özuysal, Gökmen Tayfur, and Serhan Tanyel the forecasting is performed before the actual construction of the public-transport system or major changes of the public-transport system in order to acquire the specifications and dimensions of the system needed to cope with the capacity demands.

According to DE 102011087039 A1 the capacity of busses at upcoming stops is predicted by a combination of real-time data and pre-recoded numbers of alighting passengers on the same route. In DE '039 the number of passengers waiting at each stop is monitored as to make a prediction whether all the passengers waiting at a specific stop will be able to board the bus upon arrival at that stop.

SUMMARY OF THE INVENTION

According to a first aspect, a method is provided of predicting a capacity of the public-transport vehicle for passengers to board at a stop, and for at least one of (i) displaying information representative of this capacity on at least one stationary display device at the stop and (ii) enabling data representative of this capacity to be transmitted to at least one remote computer device. The capacity of the public-transport vehicle for passengers to board at the stop corresponds to the number of passengers that can board the public transport vehicle at the stop. The method comprises two automatic processes, a prediction process and a data procurement process. The prediction process comprises predicting a capacity of the public-transport vehicle for passengers to board at the stop by measuring a filling level of the public-transport vehicle before the stop when the public-transport vehicle is approaching the stop and combining the measured filling level with a stored indication of a number of passengers expected to alight from the public-transport vehicle at the stop. The stored indication of the number of passengers expected to alight from the public-transport vehicle at the stop is the result of at least one previous execution of the data procurement process. The prediction process further comprises at least one of (i) displaying the information representative of the predicted capacity of the public-transport vehicle for passengers to board at the stop on the at least one stationary display device at the stop and (ii) enabling data representative of this capacity to be transmitted to the at least one remote computer device. The data procurement process comprises determining, when the vehicle is at the stop, the number of passengers that have alighted from the public-transport vehicle at the stop and updating the stored indication of the number of passengers expected to alight from the public-transport vehicle at the stop to be used in the future.

According to another aspect a computerized system is provided for predicting a capacity of a public-transport vehicle for passengers to board at the stop and for at least one of (i) displaying information representative of this capacity on at least one stationary display device at the stop and (ii) for enabling data representative of the capacity of the public-transport vehicle for passengers to board at the stop to be transmitted to at least one remote computer device. The capacity of the public-transport vehicle for passengers to board at the stop corresponds to the number of passengers that can board the public transport vehicle at the stop. The computerized system comprising at least one processor and at least one memory, the at least one memory comprising executable instructions that when executed by the at least one processor cause the at least one processor to perform two automatic processes, a prediction process and a data procurement process. The prediction process comprises predicting the capacity of the public-transport vehicle for passengers to board the public-transport vehicle at the stop by measuring a filling level of the public-transport vehicle before the stop when the public-transport vehicle is approaching the stop and combining the measured filling level with a stored indication of a number of passengers expected to alight from the public-transport vehicle at the stop. The stored indication of the number of passengers expected to alight from the public-transport vehicle at the stop are the result of at least one previous execution of the data procurement process. The prediction process further comprises at least one of (i) displaying the information representative of the predicted capacity of the public-transport vehicle for passengers to board at the stop on the at least one stationary display device at the stop and (ii) enabling data representative of this capacity to be transmitted to the at least one remote computer device. The data procurement process comprises determining, when the vehicle is at the stop, the number of passengers that have alighted from the public-transport vehicle at the stop and updating the stored indication of the number of passengers expected to alight from the public-transport vehicle at the stop to be used in the future.

According to yet another aspect, a method is provided of predicting a capacity of a public-transport vehicle for passengers to board at a stop and for at least one of (i) displaying information representative of this capacity on at least one stationary display device at the stop and (ii) enabling data representative of this capacity to be transmitted to at least one remote computer device. The public-transport vehicle comprises at least one passenger space with at least one measuring device sensitive to the presence of passengers. The method comprises two automatic processes, a prediction process and a data procurement process. The prediction process comprises predicting the capacity of the public-transport vehicle for passengers to board at the stop by using a stored indication of the capacity of the public-transport vehicle for passengers to board at the stop.

The stored indication of the capacity of the public-transport vehicle for passengers to board at the stop being the result of at least one previous execution of the data procurement process. The prediction process comprises at least one of (i) displaying the information representative of the predicted capacity of the public-transport vehicle for passengers to board at the stop on the at least one stationary display device at the stop and (ii) enabling data representative of this capacity to be transmitted to the at least one remote computer device. The data procurement process comprises at least one of (i) determining the capacity of the public-transport vehicle for passengers to board at the stop by scanning the at least one passenger space with the at least one measuring device when the vehicle is at the stop and (ii) by an activity comprising measuring a filling level of the public-transport vehicle before the stop by scanning the at least one passenger space with the at least one measuring device before the stop and combining the filling level with an indication of a number of alighting passengers and updating the stored indication of the capacity of the public-transport vehicle for passengers to board at the stop to be used in the future.

According to yet another aspect, a computerized system is provided for at least one of (i) predicting a capacity of a public-transport vehicle for passengers to board at a stop and for displaying information representative of this capacity on at least one stationary display device at the stop and (ii) enabling data representative of the capacity of the public-transport vehicle for passengers to board at the stop to be transmitted to at least one remote computer device. The public-transport vehicle comprises a passenger space with at least one measuring device sensitive to the presence of passengers. The system comprising at least one processor and at least one memory, the at least one memory comprising executable instructions that when executed by the at least one processor cause the at least one processor to perform two automatic processes, a prediction process and a data procurement process. The prediction process comprises predicting the capacity of the public-transport vehicle for passengers to board at the stop by using a stored indication of the capacity of the public-transport vehicle for passengers to board at the stop. The stored indication of the capacity of the public-transport vehicle for passengers to board at the stop being the result of at least one previous execution of the data procurement process. The prediction process comprises at least one of (i) displaying the information representative of the predicted capacity of the public-transport vehicle for passengers to board at the stop on the at least one stationary display device at the stop and (ii) enabling data representative of this capacity to be transmitted to the at least one remote computer device. The data procurement process comprises determining the capacity of the public-transport vehicle for passengers to board at the stop by at least one of (i) scanning the at least one passenger space with the at least one measuring device when the vehicle is at the stop, and (ii) by an activity comprising measuring a filling level of the public-transport vehicle before the stop by scanning the at least one passenger space with the at least one measuring device before the stop and combining the filling level with an indication of a number of alighting passengers. The data procurement process comprises updating the stored indication of the capacity of the public-transport vehicle for passengers to board at the stop to be used in the future.

Other features are inherent in the disclosed methods and systems or will become apparent to those skilled in the art from the following description of examples and its accompanying drawings.

GENERAL DESCRIPTION, ALSO OF OPTIONAL EMBODIMENTS OF THE INVENTION

Embodiments of the method and system described are for predicting capacity of a public-transport vehicle (PTV) for passengers to board at a stop. The embodiments use real-time data and combine them with pre-recorded datasets to provide a forecast of a capacity of a public-transport vehicle for passengers to board and updates the pre-recorded datasets with the real-time data. Thereby the capacity forecast is improved in the future. The public-transport vehicle (PTV) may be a bus or a train for passengers to board, at a stop. A representation of this capacity, i.e. the number of passengers that can board the public-transport vehicle at the stop, can be displayed on at least one stationary display device at the stop, for example, a LED screen at a train station (currently) used to indicate the arrival time or departure time of trains.

Data representative of this capacity, e.g. an HTML code or a JAVA code comprising an indication of the capacity, can also be transmitted to at least one remote computer device, such as a smart phone, a computer, or the like. The information contained in that representation, i.e. the number of passengers that can board the public-transport vehicle itself or a representative of the number, can also be made accessible via an internet connection by uploading the information representative of that number to a webserver or the like. The method is, for example, carried out by means of a computer. The computer comprises at least one processor and non-volatile memory comprising a computer program with executable instructions stored therein. The method is carried out by the at least one processor executing the instructions, wherein the instructions cause the at least one processor to carry out the activities and processes comprised by the method.

The method comprises two automatic processes: a prediction process and a data procurement process. The prediction process comprises predicting the capacity of the public-transport vehicle for passengers to board at the stop by using a stored indication of this capacity and/or a stored indication of a number of passengers expected to alight from the public-transport vehicle at the stop. As for example, the stored indication of the capacities of for passengers to board at the stop of last week's public-transport vehicles of the same line in the same timeslot, is used.

The stored indication of the capacity of the public-transport vehicle for passengers to board at the stop, i.e. number of passengers that can board the public-transport vehicle at the stop, and/or the stored indication of the number of passengers expected to alight from the public-transport vehicle at the stop, are the result of previous executions of the data procurement process.

The prediction process further comprises displaying the information representative of the predicted capacity on the at least one stationary display device at the stop, such as a customer information service screen at a bus terminal or a train station.

A transmission of data representative of this capacity to the at least one remote computer device, e.g. a smart phone, a computer, or the like, is also enabled by the method. The information representative of the capacity of the public-transport vehicle for passengers to board at the stop can also be made accessible via an internet connection, as mentioned above. The information representative of the capacity may, for example, just be the plain number of passengers that can board the public-transport vehicle or a bar diagram representing the free capacity of the public-transport vehicle at the stop.

In the data procurement process actual values of the capacity of the public-transport vehicle for passengers to board at the stop and/or the number of passengers that have alighted from the public-transport vehicle at the stop are determined and stored, for example, in a database. These values are updated either periodically or aperiodically.

The capacity of the public-transport vehicle for passengers to board at the stop can, for example, be determined by counting the number of empty seats and/or the number of empty spaces for standing passengers. In other examples the capacity is determined by determining, or measuring, the number of occupied seats and/or the number of occupied spaces for standing passengers, or—more generally—the "filling level" of the public-transport vehicle.

The number of passengers that have alighted from the public-transport vehicle can be measured by counting the (exact) number of people alighting from the vehicle, for example, by using closed-circuit television cameras, photoelectric barriers mounted at the doors of the public-transport vehicle, 3D sensors, or the like, or a combination thereof.

Thereafter, the stored indication of the capacity of the public-transport vehicle for passengers to board at the stop and/or the number of passengers expected to alight at the stop is (are) updated using the newly acquired number(s).

The updating may comprise applying data evaluation, such as averaging methods to this stored indication of the capacity along with the newly acquired capacity data. The updating may further comprise applying averaging methods to the number of passengers expected to alight along with the newly acquired number of passengers that have alighted at the stop.

In an alternative embodiment the updating simply comprises adding the newly acquired number to existing data which comprises the stored indication of the capacity and/or the number of passengers expected to alight for being used for further evaluation, namely for future prediction processes. Hence, no data evaluation is performed in the course of the update activity of the data procurement process, in this alternative embodiment, which is described in more detail below.

In the case of a data procuring process comprising an update method with data evaluation, the updating of the stored indication of the capacity of the public-transport vehicle for passengers to board at the stop and/or the number of passengers expected to alight from the public-transport vehicle at the stop is accomplished, for example, by applying averaging methods. Those averaging methods may be applied to the stored indication of the capacity of the public-transport vehicle for passengers to board and/or to the stored number of passengers expected to alight and the newly acquired numbers. Such averaging methods are, for example, a moving average (MA), a weighted moving average (WMA), or an exponential moving average (EMA). Applying a moving average means, in more detail, that a given number of stored indications of capacities for passengers to board public-transport vehicles at the stop within a given time frame, e.g. public transport vehicles of the same line of the same weekday, are summed up and divided through this given number.

When using a weighted moving average, each of the summands is multiplied with a weighting factor, wherein the weighting of the summands might increase the more up-to-date the summands are.

As mentioned above, the updating of the stored indication of the capacity of the public-transport vehicle for passengers to board at the stop and/or the number of passengers expected to alight from the public-transport vehicle at the stop is concluded by storing the newly acquired number(s), in an alternative embodiment. The storing is achieved, for example, by writing the measured numbers in a database with the previously recorded numbers. Thereby, an old dataset used for predictions in the past is extended with the newly acquired number(s). The term "dataset" is used herein for a collection of stored data typically including a plurality of records, rather than a single record of a data base.

The evaluation of this updated data, i.e. the newly acquired number(s) that were added to a storage without further processing during the update in the course of a previous data procurement process, may be performed during the prediction process in the case that no updating comprising a data evaluation was performed during the data procurement process.

The update of the indication of the stored number of passengers that have alighted from the public-transport vehicle at the stop may be carried out for public-transport services of the same line. The update may be carried out, for example, using recently measured values and stored measured values of each Monday's 07:00 am train for the previous twenty weeks.

The updated indication(s) is (are) used in the future, either for predicting the number of passengers expected to alight from the public-transport vehicle at the stop in future prediction processes or are used as an input value for another update of the ongoing data procurement process by processing newly acquired measured values.

In some embodiments the capacity of the public-transport vehicle for passengers to board at the stop is determined using a filling level of the public-transport vehicle. This filling level of the public-transport vehicle is measured before the stop.

The filling level relates to seated as well as to non-seated passengers, i.e. standing passengers. The filling level either results from a single measurement, i.e. the actual filling level of the public-transport vehicle, or from a filling level obtained from an update method applied to stored filling levels, such as an average filling level obtained from previously acquired filling levels.

In some embodiments the capacity of the public-transport vehicle for passengers to board at the stop is determined by measuring a filling level of the public-transport vehicle at the stop, when passengers have already alighted from the public-transport vehicle.

This filling level of the public-transport vehicle obtained in a moment during the stop, when all alighting passengers have already exited the public-transport vehicle, but before boarding passengers enter the public-transport vehicle, is referred to as minimum filling level. This minimum-filling level is subtracted from a maximum capacity of the public-transport vehicle, i.e. the maximum number of passengers that can be transported with the public-transport vehicle, in order to obtain the capacity for passengers to board the public-transport vehicle at the stop.

Such minimum-filling levels can be measured at the stop for a plurality of periodic services, e.g. for the same line on the same weekday in the same timeslot at the stop, and averaging methods such as the methods described above may be applied to these filling levels in order to obtain an expected minimum filling level at the stop to be subtracted from the maximum capacity of the public-transport vehicle.

In the following, exemplary methods for obtaining the minimum filling level are discussed.

If alighting and boarding sides of the public-transport vehicle are separated, i.e. passengers enter on one side and exit on the other side of the public-transport vehicle, the process of alighting and boarding at the stop can be performed as two individual processes separated in time. Hence, the minimum filling level of the public-transport vehicle at the stop can be determined by a scan carried out in a time frame between these processes.

Another example for determining the minimum filling level of the public-transport vehicle at the stop is to use weight sensors and/or pressure sensors (e.g. piezo-electrical pressure sensors) integrated into seats of the public-transport vehicle. When passengers get up from the seats to exit the public-transport vehicle at the stop, an accompanying decrease of signals indicating occupied seats is registered and a scan of the public-transport vehicle is initiated to obtain the minimum filling level of the public-transport vehicle at the stop.

A further exemplary indication for an ongoing alighting process, initiating a minimum-filling-level measurement, is a combination of opened doors and a standstill of the public-transport vehicle.

The filling level can also be measured continuously between arrival time of the public-transport vehicle at the stop and departure time of the public-transport vehicle from the stop. In this way the minimum filling level of the public-transport vehicle at the stop can be determined by continuously measuring the number of passengers transported by the public-transport vehicle within that time frame and selecting the measurement with the fewest passengers on-board.

In some embodiments the measuring devices mounted at the doors of the public-transport vehicle are used for measuring the exact number of passengers alighting from the public-transport vehicle and also for measuring the exact number of passengers boarding the public-transport vehicle at the stop. By repeatedly measuring both values for each consecutive stop of the public-transport vehicle, namely the number of passengers that have alighted from the public-transport vehicle at the stop and the number of passengers that have boarded at the stop and with knowledge of the capacity for passengers to board the public-transport vehicle before the stop the actual filling level of the public-transport vehicle at the stop can be calculated.

In some embodiments the filling level of the public-transport vehicle is directly determined, for example, by closed-circuit television cameras, 3D sensors, or the like and the filling level of the public-transport vehicle is also calculated indirectly by continuously measuring the exact number of passengers alighting from the public-transport vehicle and the exact number of passengers boarding the public-transport vehicle at each stop, for example, by using closed-circuit television cameras, photoelectric barriers mounted at the doors of the public-transport vehicle, 3D sensors, or the like, or a combination thereof.

In some embodiments a stored indication of the number of passengers expected to alight from the public-transport vehicle at the stop is combined with a stored indication of the filling level of the public-transport vehicle before the stop.

The stored indication of the number of passengers expected to alight from the public-transport vehicle at the stop and/or the stored indication of the filling level of the public-transport vehicle before the stop can be values obtained by applying the averaging methods discussed above to previously determined numbers of passengers that have alighted at the stop and/or previously measured filling levels of the public-transport vehicle before the stop.

The averaging methods may be applied on these values immediately after determining the number of passengers that have alighted at the stop and after measuring the filling level, thereby only two averaged values representing indications of these two values are stored.

Alternatively, as mentioned above, the determined number of passengers that have alighted from the public-transport vehicle at the stop and/or the measured filling level of the public-transport vehicle before the stop are stored without applying averaging methods to these values.

A full dataset of the previously determined numbers of passengers that have alighted at the stop and previously measured filling levels of the public-transport vehicle before the stop, i.e. the non-averaged values, are combined in the prediction process. In this way a loss of information is prevented and changed circumstances between the time when the values were obtained and the time the prediction is carried out can be taken into account, for example, by modifying the stored values correspondingly.

In some embodiments, the number of passengers expected to alight from the public-transport vehicle at the stop and the filling level of the public-transport vehicle before the stop correspond to the stored indication of the number of passengers that have alighted at the stop of previous rides and to the filling level of the public-transport vehicle before the stop of previous rides, respectively. The most recently obtained number of passenger that have alighted at the stop in a given time slot and the most recently obtained filling level of the public-transport vehicle before the stop of the given time slot are, for example, combined—thereby non-averaged values for obtaining the predicted capacity of the public-transport vehicle for passenger to board at the stop are used.

In some embodiments the predicted capacity of the public-transport vehicle for passengers to board at the stop corresponds to the most recently measured capacity of the public-transport vehicle for passenger to board at the stop. Hence, a replacement of the last measured capacity is performed during the update process and no data evaluation is carried out in the capacity prediction method claimed herein.

In some embodiments, combining the stored indication of a filling level before the stop and the number of passengers expected to alight at the stop may comprise a subtraction of the number of passengers expected to alight at the stop from the stored indication of the filling level of the public-transport vehicle before the stop. Thereby, an expected minimum filling level at the stop is obtained. Subtracting this expected minimum filling level from the maximum capacity of the public-transport vehicle yields the predicted capacity of the public-transport vehicle for passengers to board at the stop.

In some embodiments the predicted capacity of the public-transport vehicle for passengers to board at the stop is determined by using a stored indication of the filling level of the public-transport vehicle taken from a shorter time frame than the stored indication of the number of passengers that have alighted from the public-transport vehicle at the stop.

The capacity of the public-transport vehicle for passengers to board at the stop may be predicted, for example, using the stored filling levels of the public-transport vehicle of ten previous rides and the stored indications of numbers of passengers that have alighted at the stop in the past six months. Thereby a value derived from the stored filling levels of the ten previous rides, e.g. a mean value of those ten filling levels and a value derived from the numbers of passengers that have alighted at the stop in the last six months is determined and combined, i.e. subtracted as mentioned above, to obtain the capacity for passengers to board the public-transport vehicle at the stop.

This makes the prediction more precise if circumstances that substantially influence the filling level of the public-transport vehicle over a short term period, such as a period of ten rides, occur. Such circumstances may be unexpected failures of a line that is serving the same or a similar section of a public-transport connection as the line the prediction is made for. In particular, the stops on the approach to a transport hub will show an increased filling level of the line still in service if a parallel line is malfunctioning.

In some embodiments the predicted capacity of the public-transport vehicle for passengers to board at the stop is determined by using a stored indication of the filling level of the public-transport vehicle taken from a longer time frame than the stored indication of the number of passengers that have alighted from the public-transport vehicle at the stop.

This latter stored indication (i.e. the number of passengers that have alighted from the public-transport vehicle at the stop) used for the prediction is based, for example, on only the most recent (i.e. three to five) measurements of passenger numbers, whereas an expanded period is used for the stored indication of the filling level of the public-transport vehicle. Thereby, short-term changes in an alighting pattern of the passengers for the stop can be considered. Such short-term changes of the alighting pattern may be caused by a line skipping one or more stations due to an unexpected maintenance event. If a transportation hub or the like is no longer connected via the line, other means of transportation have to be used and therefore passengers may well alight before the skipped stations.

In some embodiments the measurement of the filling level is performed when the public-transport vehicle is approaching the stop, i.e. the measurement of the filling level refers to the same ride of the public-transport vehicle for which the prediction of the capacity for passengers to board at the stop is made and subsequently displayed on at least one stationary display device at the stop and/or transmitted to the at least one remote computer device when there is no other stop between the public-transport vehicle and this stop.

In some embodiments a first measurement of the filling level of the public-transport vehicle, corresponding to the remaining capacity of the public-transport vehicle for passengers to board is performed while the public-transport vehicle is approaching the stop, and a second measurement of the filling level of the public-transport vehicle, corresponding to the remaining capacity of the public-transport vehicle for passengers to board at the stop is performed after the alighting passengers have left the public-transport vehicle. Thereby, value pairs of capacities of the public-transport vehicle for passengers to board are obtained. In future prediction processes of future rides of the public-transport vehicle the capacity of the public-transport vehicle for passengers to board is measured while approaching a stop and the corresponding value of the pre-recorded value pair for the capacity of the public-transport vehicle for passengers to board at a stop is displayed on the at least one stationary display device and/or transmitted to the at least one remote computer device.

In some embodiments the capacity of the public-transport vehicle for passengers to board is determined by subtracting the number of passengers expected to alight at the stop, more precisely at the upcoming stop, from the measured number of passengers that are currently, i.e. before the upcoming stop, transported by the public-transport vehicle.

The number of passengers expected to alight is a result of a previous data procurement process.

In some embodiments, the number of passengers that have alighted from the public-transport vehicle at the stop is determined by a filling-level-subtraction method comprising measuring a minimum filling level at the stop and subtracting the minimum-filling-level measurement from the measurement of the filling level before the stop.

In some embodiments the number of passengers alighting and/or boarding at the stop is directly determined by at least one measuring device dedicated to the measurement of alighting passengers and/or boarding passengers. Such measuring devices may be adapted to count the number of passengers alighting from the public-transport vehicle and/or adapted to count the number of boarding passengers at the stop. Examples of such measuring devices, mounted in a circumference of the doors of the public-transport vehicle, are closed-circuit television cameras, CCD sensors, infrared interfaces such as photoelectric barriers directly at the doors, 3D sensors using infrared point clouds, 3D sensors using stereoscopic imaging techniques, or the like or a combination thereof.

Recordings obtained by the closed-circuit television cameras or 3D sensors, e.g. mounted at the doors of the public-transport vehicle, may be automatically evaluated by software, capable of differentiating passengers from luggage or the like and/or capable of analyzing the direction of movement of the passengers at the doors, i.e. deciding whether a passenger is going to exit the public-transport vehicle or not.

In some embodiments the number of alighting/boarding passengers is obtained by a plurality of different measuring devices as mentioned above, wherein the results of those different measuring methods are combined in order to increase accuracy of the measurement of the number of alighting/boarding passengers.

The number of passengers that are currently in the public-transport vehicle is derived from the measured filling level of the public-transport vehicle. As the prediction of the capacity of the public-transport vehicle for passengers to board at the stop is based on the current measurement of the filling level of the public-transport vehicle approaching the stop, a short term prediction is made.

The accuracy of the prediction is increased by measuring one of the two values needed to predict the capacity of the public-transport vehicle for passengers to board at the stop shortly before arriving at the stop. The data procurement process stores the number of passengers that have alighted at the stop, as a basis for the determination of the indication of the number of passengers expected to alight used in the next prediction process for this public-transport service.

As the capacity of the public-transport vehicle for passengers to board is determined by combining a value measured shortly before the stop, which is therefore quite accurate, i.e. the filling level of the public-transport vehicle before the stop, and a predicted value, i.e. the number of passengers expected to alight at the stop, the statistical dispersion of the predicted capacity of passengers to board, e.g. a variance or an average absolute deviation, is reduced, since only the number of passengers expected to alight may suffer from such a dispersion.

In some embodiments a mean value of both the measurements of the filling level before the stop in the past and the measurements of the number of passengers that have alighted at the stop in the past are used to determine the expected capacity at the stop on the basis of previous rides of the same public-transport service.

The filling level corrected by the stored indication of passengers expected to alight provides an expected minimum filling level at the stop when all alighting passengers have left the public-transport vehicle. Subtracting this expected minimum filling level from the maximum capacity of the public-transport vehicle results in the capacity of the public-transport vehicle for passengers to board at the stop.

In some embodiments the representation of the predicted number of alighting passengers is an absolute number and the representation of the capacity of the public-transport vehicle for passengers to board at the stop, is an absolute number, i.e. the number of passengers that can board the public-transport vehicle at the stop.

In some embodiments the representation of the number of passengers expected to alight is a number relative to the filling level and/or to a maximum capacity of the public-transport vehicle, e.g. a percentage of the maximum capacity of the public-transport vehicle, and the representation of the predicted number of passengers that can board the public-transport vehicle, corresponding to the number of passengers that can board the public-transport vehicle at the stop is a number, e.g. a percentage, relative to the filling level and/or to a maximum capacity of the public-transport vehicle.

In some embodiments the representation of the number of passengers expected to alight is an absolute number and the representation of the capacity of the public-transport vehicle for passengers to board at the stop is a number, e.g. a percentage, relative to the filling level and/or to the maximum capacity of the public-transport vehicle or vice versa.

In some embodiments the prediction process and/or the data procurement process are adapted to take weather conditions, and/or traffic-relevant events and/or public holidays into account.

The processes have capabilities to adapt to such traffic-relevant external factors. For example, heavy rain leads to an increased demand for public-transport services, which can be anticipated by the prediction process and the underlying data procurement process. Football matches, concerts, scheduled maintenance and construction work, or other traffic-relevant events may also be anticipated by the prediction process and the underlying data procurement process.

In some embodiments, the anticipation and adaption to these traffic-relevant external factors is achieved through at least one capacity-expectation-modifying parameter. The at least one capacity-expectation-modifying parameter can either be intrinsically included in the prediction and/or the data procurement process or the usage of capacity-expectation-modifying parameters can be activated by switching from a normal operation mode of the prediction and/or the data procurement process to an exceptional operation mode.

In some embodiments the capacity of the public-transport vehicle for passengers to board at the stop is directly altered by at least one positive or negative capacity-expectation-modifying parameter that corresponds to an influence of the traffic-relevant external factors on the filling level and/or the number of passengers alighting.

A capacity-expectation-modifying parameter for weather conditions, another capacity-expectation-modifying parameter for public holidays and still another capacity-expectation-modifying parameter for public events, for example, can be introduced independently from each other. Such capacity-expectation-modifying parameters may be introduced into the update method used by the data procurement process. At least one positive and/or negative capacity-expectation-modifying parameter may be added to a weighted moving average of the filling level and/or the number of passengers alighting from the public-transport vehicle at the stop. Thereby, capacity of the public-transport vehicle for passengers to board at the stop is modified accordingly as it results from a combination of those two quantities altered by the at least one capacity-expectation-modifying parameter. Also a change of the weighting factors in a weighted moving average of the filling level and/or the number of passengers alighting from the public-transport vehicle at the stop may be achieved through the capacity-expectation-modifying parameters.

If a sudden increase of the filling level of the public-transport vehicle and/or the number of passengers alighting at the stop is expected, for example due to a concert, the weighting factors in a weighted moving average may be increased for values obtained during a short time frame before the concert and decreased for all values obtained before.

The weighting factors may also be a result of a polynomial function, coefficients of which are determined by a regression analysis of measured capacities of the public-transport vehicle for passengers to board at the stop.

The at least one capacity-expectation-modifying parameter is set, for example, by a public-transport authority or is automatically read from a database or from a plurality of databases in which traffic-relevant event data is stored, such as weather forecast databases and/or event databases and/or maintenance databases of the public-transport authority, or is automatically set when the filling levels of a public-transport vehicle and/or the number of passengers alighting from the public-transport vehicle is above (below) a predefined threshold for a given number of subsequent public-transport services at the stop, i.e. public-transport vehicles of the same line.

Such a traffic-relevant event may occur, for example, if two or more different public-transport lines interconnect two traffic hubs, and one of these lines fails. In this case the demand for the remaining functioning line(s) is increased, resulting in a higher filling level of the functioning line(s). As such an increased filling level can be anticipated by the public-transport authority, the normal prediction of the capacity of the public-transport vehicle for passengers to board may be altered by the at least one capacity-expectation-modifying parameter, e.g. the expected filling level of the cancelled line may be added to that of the line(s) which is (are) still in operation.

The above-mentioned capacity-expectation-modifying parameter(s) can also be determined, stored and updated, e.g. by applying averaging methods as described in conjunction with the data procurement process, in a learning process for capacity-expectation-modifying parameter(s). In this learning process the capacity-expectation-modifying parameter(s) that would have provided the accurate capacity of the public-transport vehicle for passengers to board at the stop is (are) determined by comparing measured numbers of passengers that have alighted from the public-transport vehicle at the stop and/or the actual determined capacity of the public-transport vehicle for passengers to board at the stop with the predicted values for this stop.

The weather forecast for the day for which the prediction of capacity of the public-transport vehicle for passengers to board is made can, for example, be read from a weather forecast database of a local metrology station and a stored capacity-expectation-modifying parameter corresponding to these weather conditions is used for the prediction. After the actual capacity of the public-transport vehicle for passengers to board at a stop has been measured, this actual capacity is compared with the predicted capacity for that stop which is based on the capacity-expectation-modifying parameter for weather conditions. In this way, the capacity-expectation-modifying parameter that would have resulted in the actual capacity for passengers to board at that stop, i.e. the actual capacity-expectation-modifying parameter, is determined. The capacity-expectation-modifying parameter, corresponding to the given weather condition during the prediction, is modified, for example, averaged using previously stored actual capacity-expectation-modifying parameters, and the newly obtained actual value of the capacity-expectation-modifying parameter to yield a more precise prediction in the future.

In some embodiments the prediction process is adapted to take the capacity of a given number of previous public-transport vehicles for passengers to board at the stop into account, e. g. the last ten public-transport vehicles of the same line. Thereby, a correlated indication of the capacity of the public-transport vehicle for passengers to board at the stop is obtained and can be stored for future prediction processes. These last rides may be consecutive rides on the current day, when the prediction is made, or these rides may alternatively be rides of the same timeslot measured over the course of several weeks.

By using a correlated indication of the number of passengers that can board the public-transport vehicle at the stop obtained from a small number of previous (consecutive) rides, short-term changes in the actually available capacity of the public-transport vehicle for passengers to board can be considered. For example, if an increased filling level is measured throughout the last five rides of the public-transport vehicle of the same line, only the last five rides are taken into account, i.e. evaluated in the course of an update process as discussed above, for a prediction of the capacity for passengers to board the public-transport vehicle of the same line at the stop for the next ride(s) of the public-transport vehicle.

In some embodiments a given number of previous rides of public-transport vehicles of similar lines, i.e. lines sharing a plurality of stops in a public-transport network, are taken into account for the prediction, thereby creating an increased number of stored capacities of the public-transport vehicle for passengers to board at the stop within a given time frame.

As the number of capacities to be evaluated within the update method for obtaining a predicted capacity is increased, the errors of a statistical data analysis performed in the course of the update method, e.g. the variance, decreases. Thus, the quality of the prediction is increased on the assumption that the capacities of the (different) public-transport vehicles of the similar lines for passengers to board at the stop are similar for each of these (different) public-transport vehicles.

In some embodiments the public-transport vehicle is subdivided into a plurality of sections. Each of the sections has an individual filling level. The individual filling levels can be combined to a filling level of the entire public-transport vehicle.

In some embodiments the sections of the public-transport vehicle are carriages and/or compartments. In an exemplary embodiment the individual filling levels for each carriage of a train are displayed on at least one customer information screen (CIS) on a train platform. This information provides a suggestion to passengers on the platform where to board the train, so as to get on the least crowded carriage of the train.

In some embodiments the public-transport vehicle has space dedicated to passengers, subsequently referred to as passenger space. Measuring the filling level of the public-transport vehicle includes scanning the passenger space with at least one measuring device sensitive to the presence of passengers. The passenger space of each section can either be scanned simultaneously or in successive order with the measuring devices.

The presence of passengers can, for example, be detected by the sensors by analyzing volumetric data. According to a predetermined threshold for length, breadth, and height and/or predetermined ratios of length, breadth, and height objects are either recognized as passengers or luggage.

In this way the number of passengers in a space dedicated to passengers in a section of the public-transport vehicle can be determined. This number corresponds to a filling level of the public-transport vehicle when considering the maximum capacity of the passenger space of a section of the public-transport vehicle.

In some embodiments the public-transport vehicle has space dedicated to luggage, subsequently referred to as luggage space. Measuring the filling level of the public-transport vehicle includes scanning the luggage space with at least one measuring device sensitive to the presence of luggage. The luggage space of each section can either be scanned simultaneously or in successive order with the measuring devices.

The presence of luggage can, for example, be detected by the sensors by analyzing volumetric data. According to a predetermined threshold for length, breadth, and height and/or predetermined ratios of length, breadth, and height objects are either recognized as passengers or luggage.

In this way an amount of luggage in a space dedicated to luggage in a section of the public-transport vehicle can be determined. This amount corresponds to a luggage-related filling level of the public-transport vehicle when considering the maximum capacity of the luggage space of a section of the public-transport vehicle.

In some embodiments the prediction process and the data procurement process used for predicting the capacity of the public-transport vehicle for passengers to board at the stop can also be applied to generate a prediction for an amount of luggage that can be stored in the luggage space, accordingly.

The underlying methods of the prediction and the data procurement process are carried out in the same way for luggage as for passengers. For example, the free capacity for passengers to board and the free capacity of the luggage space can be displayed together on the same display device at once.

In some embodiments, when travel or mobility accessories, for example, a piece of luggage, a wheelchair, a bicycle or a pram that are meant to be deposited in the luggage space, are actually deposited in the passenger space, e.g. a suitcase deposited in an aisle or on a seat, the accessories are counted as passengers.

Since passenger space and luggage space are separated, objects present in the passenger space, which are recognized either as passengers or luggage, are counted as passengers as the filling level of the passenger space is increased by the volume of the object.

If a passenger alights from the public-transport vehicle at the stop with an incorrectly parked travel or mobility accessory, i.e. an accessory which was deposited in the passenger space and was therefore counted as a passenger, two alighting passengers are counted, i.e. the passenger and the incorrectly parked travel or mobility accessory.

In some embodiments, when an object is detected and defined as luggage but yet located in a passenger space, it is counted as a "reduction in passenger space". Thereupon, a message containing a remark about the misplaced luggage piece is sent to the public-transport authority and/or to at least one staff member present in the public-transport vehicle and/or to at least one staff member located at the next stop.

In some embodiments the filling level of the public-transport vehicle is measured by a background-subtraction method in which a result of the scan of the public-transport vehicle with and without passengers and/or luggage is combined.

Thereby, the result of the scan of the public-transport vehicle before the stop, approaching the stop, or at the stop is corrected by the scan without passengers and/or without luggage, further referred to as blank-scan of the public-transport vehicle. For example, an image obtained by a scan of the space of an empty public-transport vehicle dedicated to passengers and/or to luggage or a section thereof is subtracted point wise from a current image obtained by a scan of the same space of a public-transport vehicle dedicated to passengers and/or to luggage or a section thereof, when the public-transport vehicle is approaching the stop. This point-wise subtraction may be done as a pixel-by-pixel comparison of 2D images or as a voxel-by-voxel comparison of 3D images. The subtraction is, for example, carried out by means of at least one on-board computer located in the public-transport vehicle to which either all measuring devices of a section or all measuring devices of the entire public-transport vehicle are connected. The subtraction can also be carried out in an external control center to which the raw or pre-processed image data, gathered by the measuring devices, is sent over a wireless connection.

In some embodiments the space of the public-transport vehicle dedicated to passenger's and/or dedicated to luggage is (are) defined by physical markers. These markers, e.g. infrared reflectors of specific frequencies, are detectable by the at least one measuring device during the blank-scan of the public-transport vehicle.

In some embodiments the space of the public-transport vehicle dedicated to passengers and/or to luggage is (are) defined by post-editing the blank-scan. For example, an image resulting from the blank-scan can be manually modified with appropriate software, e.g. "mapamok" from the Yamaguchi Center for Arts and Media, to define individual spaces dedicated to passengers and/or to luggage. The post-editing of the blank-scan is, for example, also carried out in an external control center and has only to be done once for each section of the public-transport vehicle.

In some embodiments a plurality of measuring devices is equipped with at least one infrared emitter to create infrared point clouds and/or structured infrared patterns and at least one infrared detector to receive infrared point clouds and/or structured infrared patterns.

The infrared point cloud(s) and/or structured infrared pattern(s) is (are) emitted by the measuring devices during the scan(s) of the public-transport vehicle. For example, an infrared speckle pattern is created and projected onto the passengers and/or the luggage by an infrared-light projection assembly of the measuring devices. The infrared speckle pattern is subsequently detected by an image capture assembly of the measuring devices.

This enables a 3D depth map of the space(s) in the public-transport vehicle dedicated to passengers and/or to luggage to be created. The 3D depth map is obtained, for example, by a computer vision technique further referred to as "depth from focus".

Depth from focus relates to projecting a known pattern onto objects within the public-transport vehicle and inferring from a deformation of the known pattern the shape of the objects and the distance of the objects from a measuring device.

The measuring devices are, for example, equipped with an infrared light source and an astigmatic optical element, which may also have collimating optic properties. The astigmatic optical element causes the shape of the spots which are projected onto the objects to be elongated with a direction of elongation that varies with distance from the astigmatic optical element.

This phenomenon arises because the astigmatic optic element has different focal lengths in different meridional planes. The measuring devices are also equipped with an image capture assembly, for example, an array of detector elements, such as CCD or CMOS-based image sensor arrays.

Subsequent to the creation of the 3D depth maps of a scanning range of each measuring device within the public-transport vehicle, those 3D depth maps may be stitched together to create a 3D depth map of at least a section of the public-transport vehicle or the entire public transport vehicle. The 3D depth maps are created by the measuring devices by processing raw data obtained by the image capture assembly. Stitching together these 3D depth maps is accomplished, for example, either by means of at least one on-board computer connected to at least the measuring devices of the scanned section or in an external control center. In the stitching process overlapping recordings of the measuring devices may also be compensated.

According to a second aspect a computerized system for predicting the capacity of the public-transport vehicle for passengers to board at the stop is provided. A representation of this capacity can be displayed by the computerized system on at least one stationary display device at the stop, for example, a customer information screen. The data representative of this capacity, can also be transmitted by the computerized system to at least one remote computer device, e.g. a smart phone, or a computer. The information contained in that representation can also be made accessible by the computerized system via an internet connection by uploading the information representative of the capacity of the public-transport vehicle for passengers to board at the stop to a webserver or the like.

The computerized system is programmed to perform two automatic processes, a prediction process and a data procurement process. The computerized system comprises for example an on-board computer for carrying out the data procurement process and at least one computer in an external control center for carrying out the prediction process. Alternatively both processes are carried out by the same computer, for example, the on-board computer. Both the on-board computer or the at least one computer in the external control center are equipped with at least one processor and a non-volatile memory and a computer program with executable instructions stored therein. These instructions cause the at least one processor, when executed on the at least one processor of the respective computer to execute a prediction process and/or a data-procurement process as described herein. The prediction process comprises predicting capacity of the public-transport vehicle for passengers to board at the stop by using a stored indication of this capacity and/or a stored indication of a number of passengers expected to alight from the public-transport vehicle at the stop.

The stored indication of the capacity of the public-transport vehicle for passengers to board at the stop, i.e. the number of passengers that can board the public-transport vehicle at the stop and/or the number of passengers expected to alight from the public-transport vehicle at the stop are the result of at least one previous execution of the data procurement process.

In the data procurement process actual values of the capacity of the public-transport vehicle for passengers to board at the stop and/or the number of passengers that have alighted from the public-transport vehicle at the stop are measured and stored by the computerized system. These values are updated either periodically or aperiodically.

During the prediction process the information representative of the predicted capacity of the public-transport vehicle for passengers to board at the stop is displayed on the at least one stationary display device of the computerized system at the stop.

The computerized system enables a transmission of data representative of this capacity to the at least one remote computer device, e.g. a smart phone, a computer, or the like. The information representative of this capacity can also be made accessible via an interne connection, as mentioned above. The information representative of the capacity may, for example, just be the plain number of passengers that can board the public-transport vehicle or a bar diagram representing the capacity of the public-transport vehicle at the stop.

In the data procurement process the actual capacity of the public-transport vehicle for passengers to board at the stop and/or the number of passengers that have actually alighted from the public-transport vehicle at the stop is (are) determined by the computerized system. The capacity of the public-transport vehicle can be determined by the computerized system, for example, by counting the number of empty seats and/or the number of empty spaces for standing passengers. In other examples the capacity is determined by determining, or measuring, the number of occupied seats and/or the number of occupied spaces for standing passengers, or—more generally—the "filling level" of the public-transport vehicle.

The number of passengers that have alighted from the public-transport vehicle can be measured by the computerized system by counting the (exact) number of people alighting from the vehicle, for example, by using closed-circuit television cameras, infrared light sensors at the doors of the public-transport vehicle, 3D sensors, or the like, or a combination thereof. Thereafter, the stored indication of the capacity of the public-transport vehicle for passengers to board at the stop and/or the number of passengers expected to alight at the stop is (are) updated by the computerized system using the newly acquired number(s).

An update method is carried out in the course of the data procurement process by the computerized system. As described above, the update method may comprise a data evaluation of stored data in combination with the recently measured data, or may only comprise extending a dataset of previously measured and stored data with the recently measured data.

The updating of the data obtained in the data procurement process, i.e. the stored indication of the capacity of the public-transport vehicle for passengers to board at the stop and/or the number of passengers expected to alight from the public-transport vehicle at the stop, is (are) accomplished by the computerized system by, e.g. averaging methods, such as moving average (MA), weighted moving average (WMA), or exponential moving average (EMA).

As mentioned above, the updating of the stored indication of the capacity of the public-transport vehicle for passengers to board at the stop and/or the number of passengers expected to alight from the public-transport vehicle at the stop may be concluded by storing the newly acquired number(s). The storing is achieved, for example, by writing the measured numbers in a database with the previously recorded numbers. Thereby, an old dataset used for predictions in the past is extended with the newly acquired number(s).

The evaluation of this updated data, i.e. the newly acquired number(s) that were added to a storage without further processing during the update in the course of a previous data procurement process, may be performed during the prediction process in the case that no updating comprising a data evaluation was performed during the data procurement process.

The computerized system is programmed to use this updated indication and/or this updated number of passengers expected to alight, either for predicting the capacity of the public-transport vehicle at the stop in future prediction processes or as an input value for an update of another data procurement process.

The computerized system is arranged to carry out the methods described above.

BRIEF DESCRIPTION OF THE DRAWINGS

Exemplary embodiments of the invention are now described, also with reference to the accompanying drawings, wherein.

The drawings and the description of the drawings are of examples of the invention and are not of the invention itself.

DESCRIPTION OF EMBODIMENTS

Figure 1:
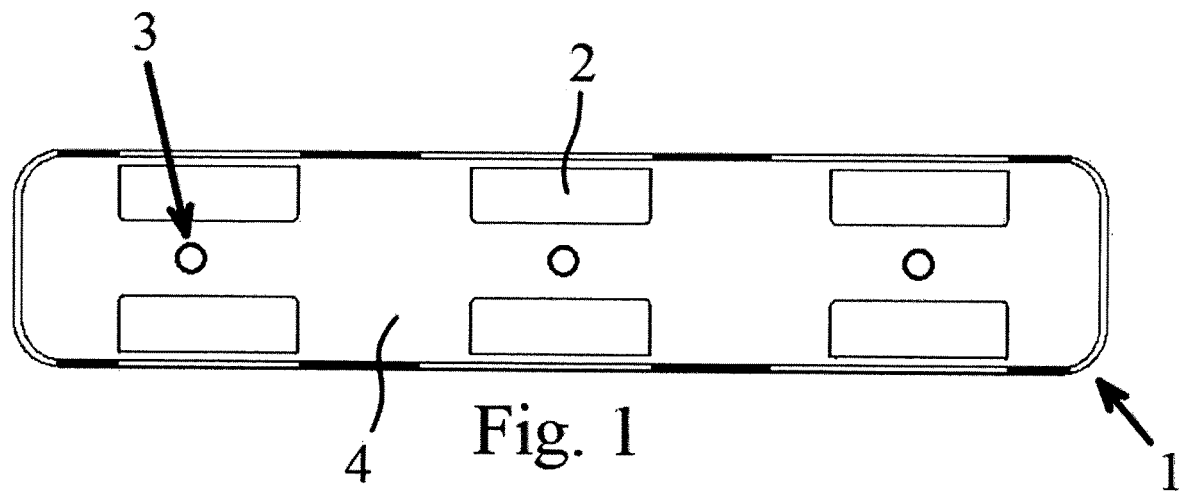
FIG. 1 illustrates a train carriage with passenger space, during a blank scan.

A section of a public-transport vehicle 1, represented by a carriage of a train, equipped with measuring devices 3 is illustrated by FIG. 1 in a schematic top view of the carriage. The measuring devices 3 are sensitive to the presence of passengers 6 and/or luggage 7. A blank scan of the section, i.e. a scan without passengers 6 and/or without luggage 7, is carried out by the measuring devices 3, which are mounted on the ceiling of the train-carriage. The three measuring devices 3 are equipped with infrared emitters and infrared detectors as well as with astigmatic optical elements.

By creating and detecting infrared point clouds and/or structured light patterns they obtain a 3D depth map 80 of the empty section, i.e. the blank scan, as described in the "general description" of this document. Each of the measuring devices 3 is positioned between two opposing seat rows 2 of the section. During the blank scan the section is either scanned by all measuring devices 3 simultaneously or the blank scan is carried out by activating the measuring devices 3 in a successive order and stitching together the images, i.e. the 3D depth maps 80, obtained by the scans.

By post processing the blank-scan, a passenger space 4 of the section, i.e. the space of the section dedicated to passengers and a luggage space 5, i.e. the space of the section dedicated to luggage 7, are identified and marked. The section of the public-transport vehicle 1 illustrated by FIG. 1 has no luggage space 5, but only a passenger space 4.

Figure 2:
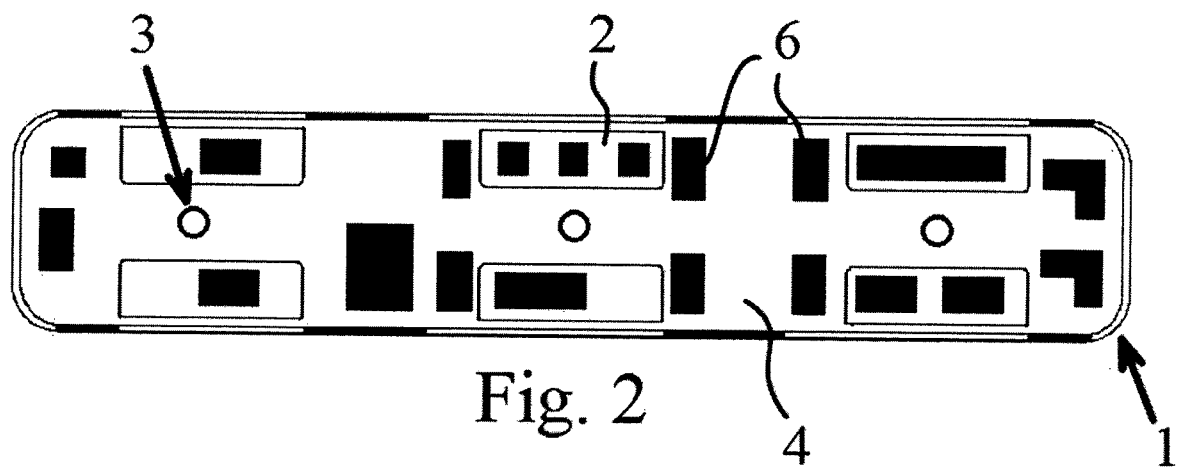
FIG. 2 illustrates a train carriage with a passenger space, when measuring a filling level.

The same section (train carriage) of a public transport vehicle 1 as described in conjunction with FIG. 1 is illustrated by FIG. 2, but with passengers 6 located in the passenger space 4 of the section. The scan of the section is carried out in the same way as described in conjunction with FIG. 1 and the same measuring devices 3 are used. However, as passengers 6 are seated in the seating rows 2 of the section or standing in the passenger space 4, the scan is not a blank scan, but a scan of a partly occupied section as the public transport vehicle 1 (the train) heads towards a stop. The scan results in a 3D depth map 80 of a partially occupied passenger space 4. The 3D depth map 80 of the section obtained by the blank scan is subsequently subtracted from the 3D depth map 80 of the section with passengers 6 and/or luggage 7.

By post-processing either the image obtained by this subtraction or by directly post-processing the 3D depth map 80 of the section with passengers 6 and/or luggage 7, objects within the section are recognized either as passengers 6 or luggage 7. This is, for example, achieved by analyzing volumetric data of the scans and categorizing objects according to a predetermined threshold for length, breadth and height and/or according to predetermined ratios of those quantities. The final result of the scans and this post processing of scan data is a filling level 420 of the passenger space 4 of the section of the public transport vehicle 1. Since the train-carriage illustrated by FIG. 2 has no luggage space 5, only the filling level 420 of the passenger space 4 is determined.

Figure 3:
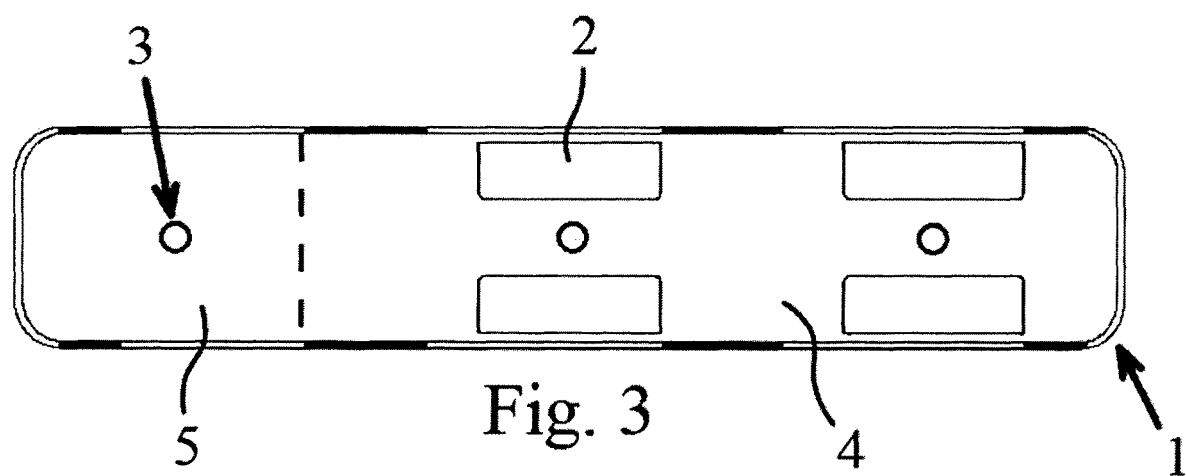
FIG. 3 illustrates a train carriage with a passenger space and a luggage space, during a blank scan.

The section of a public-transport vehicle 1 without passengers 6 and/or luggage 7 illustrated by FIG. 3 has a passenger space 4 and a luggage space 5. The passenger space 4 and luggage space 5 are spatially separated from each other, as indicated by the dashed line in FIG. 3. A blank scan and post-editing process is carried out for this section as described in conjunction with FIG. 1. Thereby a 3D depth map 80 of the empty section is created and the luggage space 5 and the passenger space 4 are identified.

Figure 4:
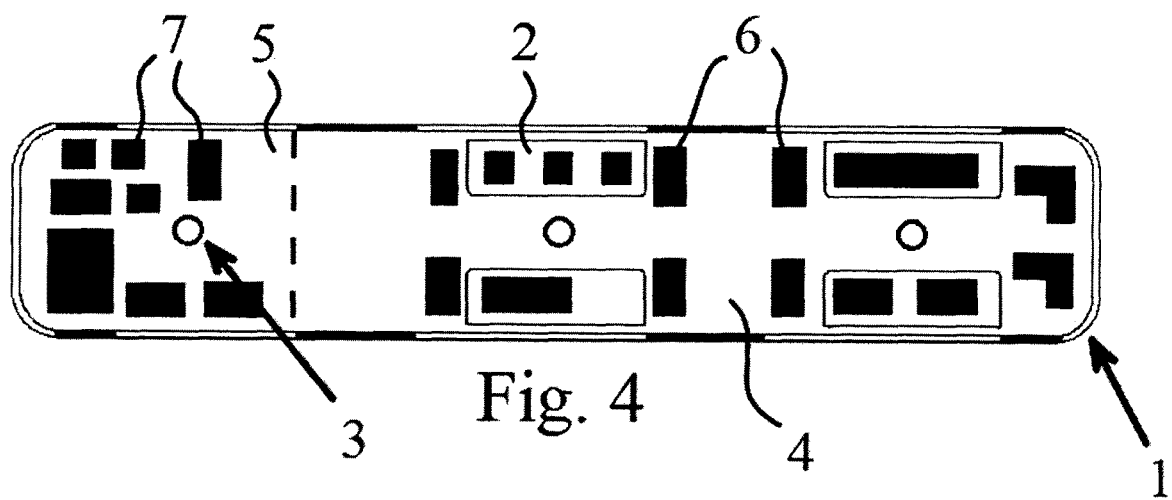
FIG. 4 illustrates a train carriage with a passenger space and luggage space, when measuring a filling level.

The same section of a public transport vehicle 1 as described in conjunction with FIG. 3 is illustrated by FIG. 4, but with passengers 6 located in the passenger space 4 of the train-carriage and luggage 7 parked in the luggage space 5 of the public-transport vehicle. By carrying out a scan and subsequent post-processing, i.e. subtracting the blank scan and differentiating luggage 7 from passengers 6, as described in conjunction with FIG. 2, a filling level 420 of the luggage space 5 and a filling level 420 of the passenger space 4 are determined.

Figure 5:
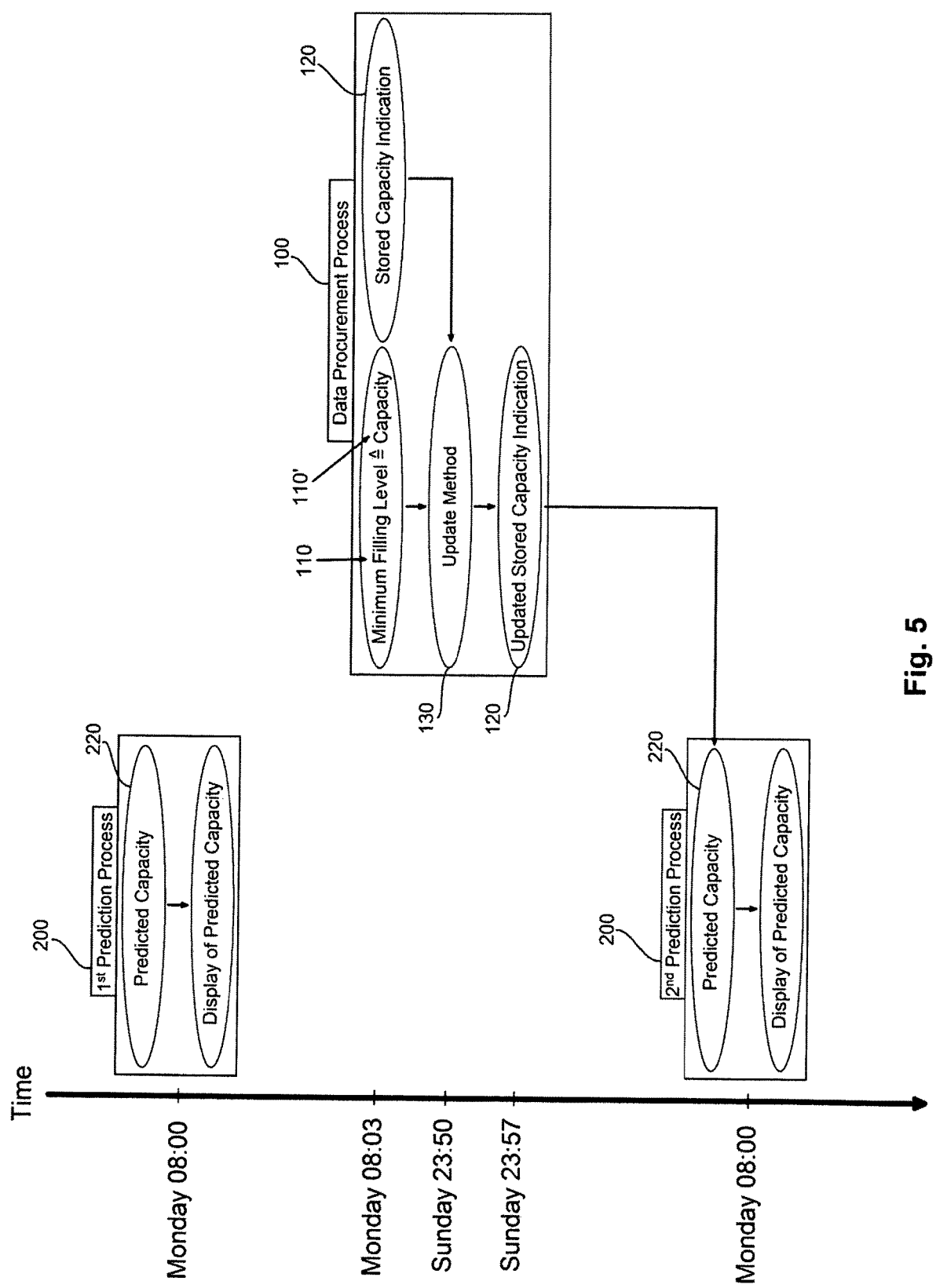
FIG. 5 illustrates an excerpt of the prediction and the data procurement processes, with an update of all measured data once a week.

An excerpt of both an exemplary prediction process 200 and exemplary data procurement process 100 as used by the method and the computerized system claimed herein, is shown in FIG. 5.

The chronological order of events illustrated in FIG. 5 is indicated by a timeline on the left hand side of the figure. On Monday morning of week one a predicted capacity of a public-transport vehicle 220 is displayed at a stop. This predicted capacity 220 might also be transmitted to remote computer devices 60. After the alighting passengers 6 have left the public-transport vehicle 1, the minimum filling level 110, i.e. the capacity of the public-transport vehicle 1 for passengers to board, is measured by the measuring devices 3 and stored on an on-board computer 40 for later update processes in an external control center 70.

Once a week, in this exemplary embodiment Sundays at night, the measured minimum filling levels 110 at all the stops of all public-transport vehicles 1 of the past week are combined with stored capacity indications 120 of the respective stops in an update method 130. In an alternative embodiment several update methods 130 are performed for the ongoing data procurement process 100 creating input values for corresponding prediction processes 200. As mentioned above, the minimum filling level 110 corresponds to the actual capacity of the public-transport vehicle for passengers to board at the stop 110', as a subtraction of the minimum filling level 110 from the maximum capacity of the public-transport vehicle 1 yields in that actual capacity 110'. The update method 130 includes, for example, determining an exponential moving average of the previously measured and stored minimum filling levels 110 and the most recently measured and stored minimum filling level 110. This provides an updated stored capacity indication 120, which gives the predicted capacity of the public-transport vehicle for passengers to board at a stop 220 for the next week, for all the stops and lines. The predicted capacity 220 for Monday morning of week two is hence improved by the update method 130 and is displayed on the platform.

Figure 6:
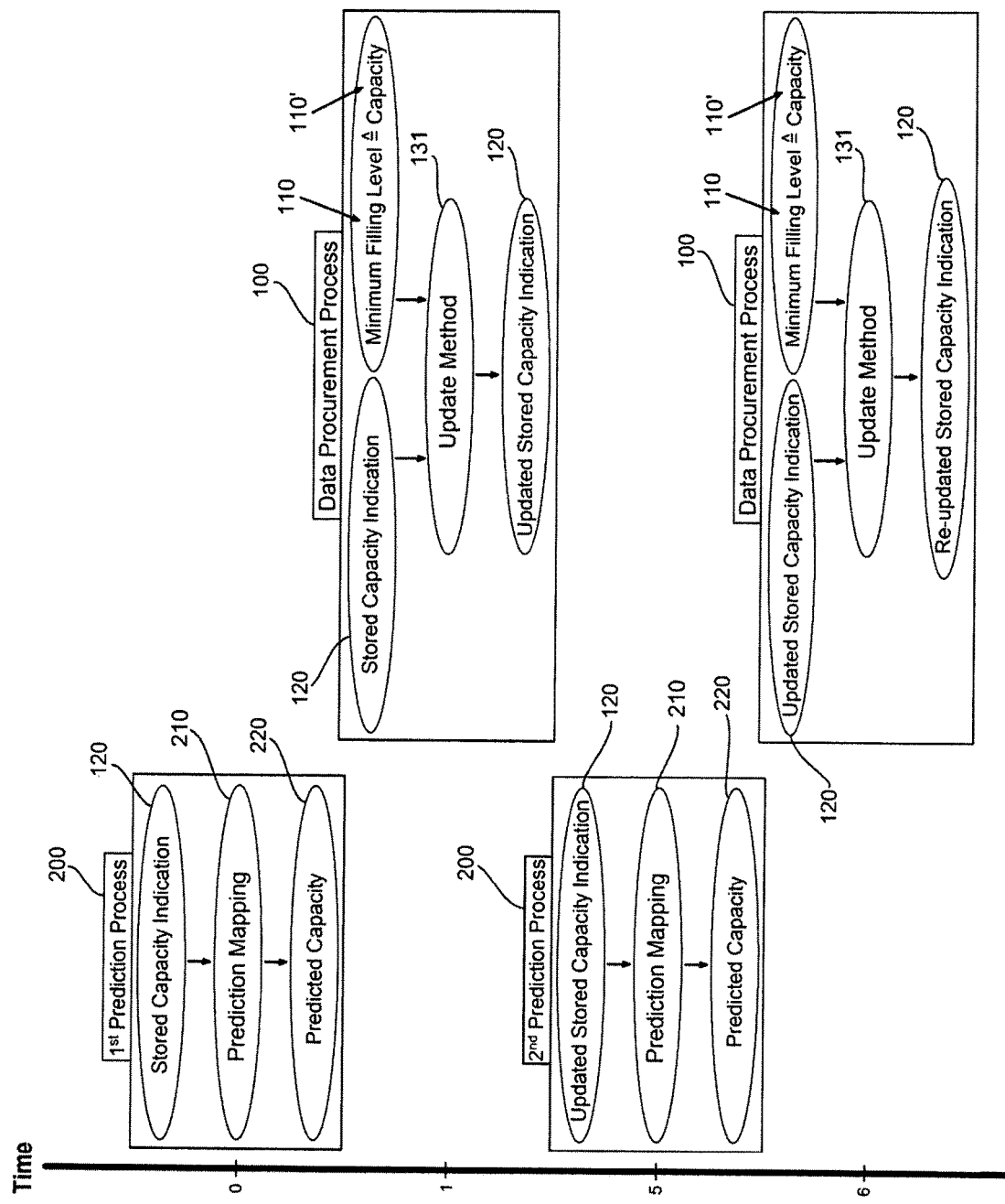
FIG. 6 illustrates an excerpt of the prediction and the data procurement processes, evaluating data during the prediction.

Another excerpt of both an exemplary prediction process 200 and exemplary data procurement process 100 is shown in FIG. 6. In this embodiment the prediction of capacities of the public-transport vehicle for passenger to board 220 is performed in a shorter time frame, e.g. for subsequent rides of the same line.

Figure 9:
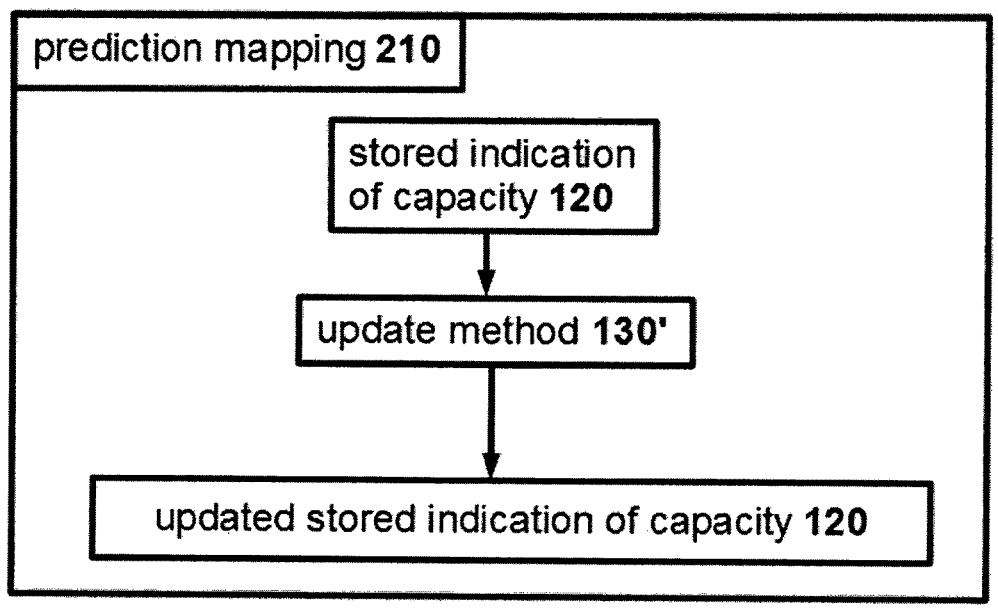
FIG. 9 illustrates the prediction mapping activity of FIG. 6, with data evaluation.

In the course of the prediction mapping 210, which is illustrated by FIG. 9 and further described in conjunction with that figure, an update method 130' (not shown in FIG. 6), e.g. an averaging method as described in the part "general description", is applied to the stored indication of capacity 120 to obtain an updated stored indication of capacity 120 resulting in the predicted capacity 220. The data evaluation is carried out in the course of the prediction mapping 210, a short time, e.g. seconds, before the predicted capacity 220 is displayed. Hence, influences on traffic in a time frame between a data procurement process 100 and the prediction process 200 can be accounted for.

During the data procurement process 100 of FIG. 6 (timestamp "1" and "6") an update method 131 is carried out. In the course of update method 131 the recently obtained minimum filling level 110 is included into the dataset corresponding to the stored capacity indication 120, thus resulting in the updated stored capacity indication 120 and no further data evaluation methods are performed by the update method 131.

Another prediction process 200 with a corresponding prediction mapping 210 is carried out subsequent to such a data procurement process 100 at timestamp "5".

Figure 7:
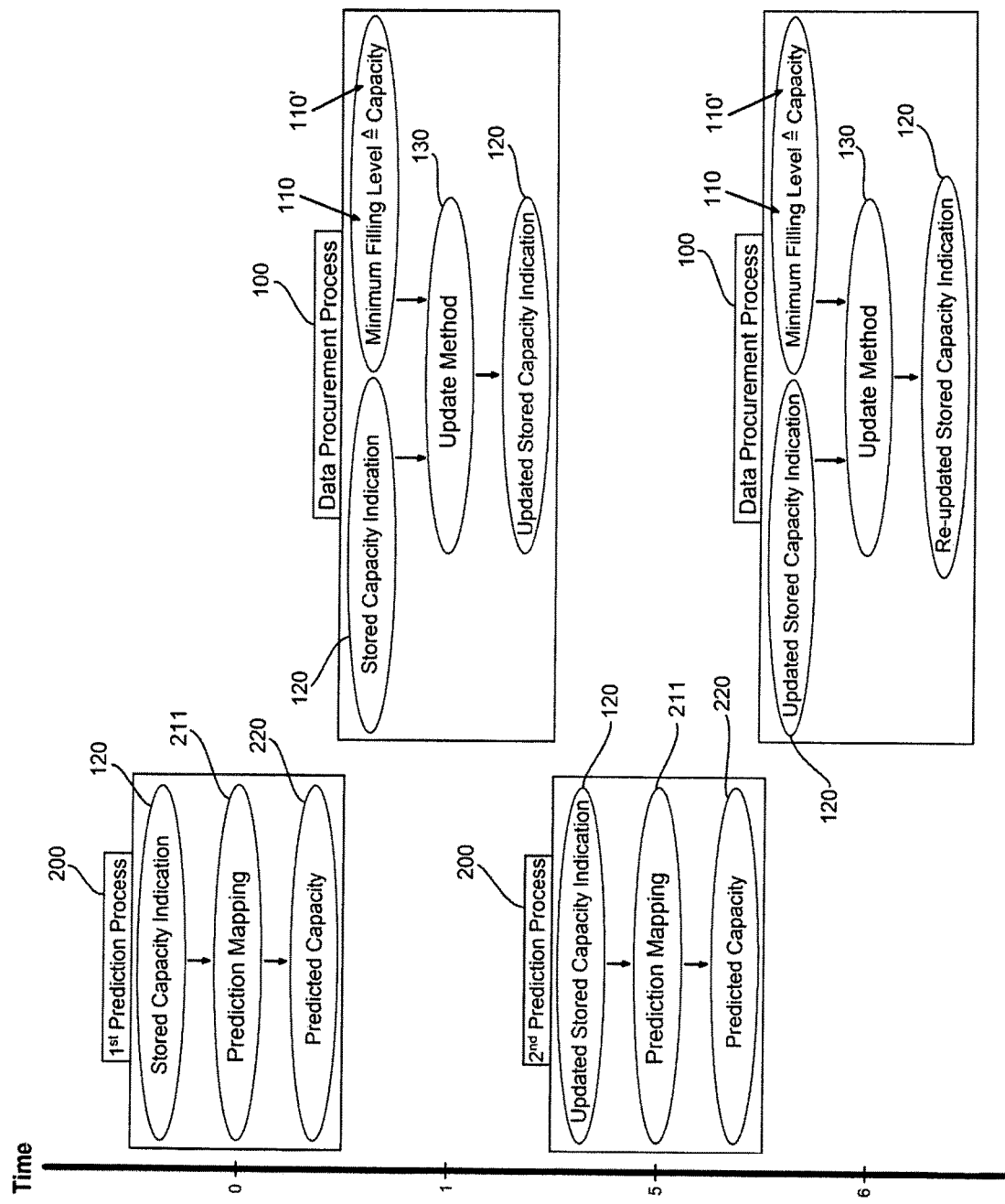
FIG. 7 illustrates an excerpt of the prediction and the data procurement processes, taking short term influences on passenger flows into account.

Another excerpt of both an exemplary prediction process 200 and exemplary data procurement process 100 is shown in FIG. 7. In this embodiment the prediction of capacities of the public-transport vehicle for passenger to board 220 is performed in a shorter time frame, e.g. for subsequent rides of the same line. The update method 130 of FIG. 7 and the prediction mapping 211 differ from those described in conjunction with FIG. 6.

In a first prediction process 200, at timestamp "0" illustrated on the left-hand side of FIG. 7, a stored capacity indication 120 is mapped onto a predicted capacity 220 by a prediction mapping process 211. This prediction mapping 211 comprises modifying the stored capacity indication 120 by one or more capacity-expectation-modifying parameters 260 in the case of non-periodic traffic-relevant events, e.g. football matches, to take the influence of those events on passenger flow into account.

Figure 10:
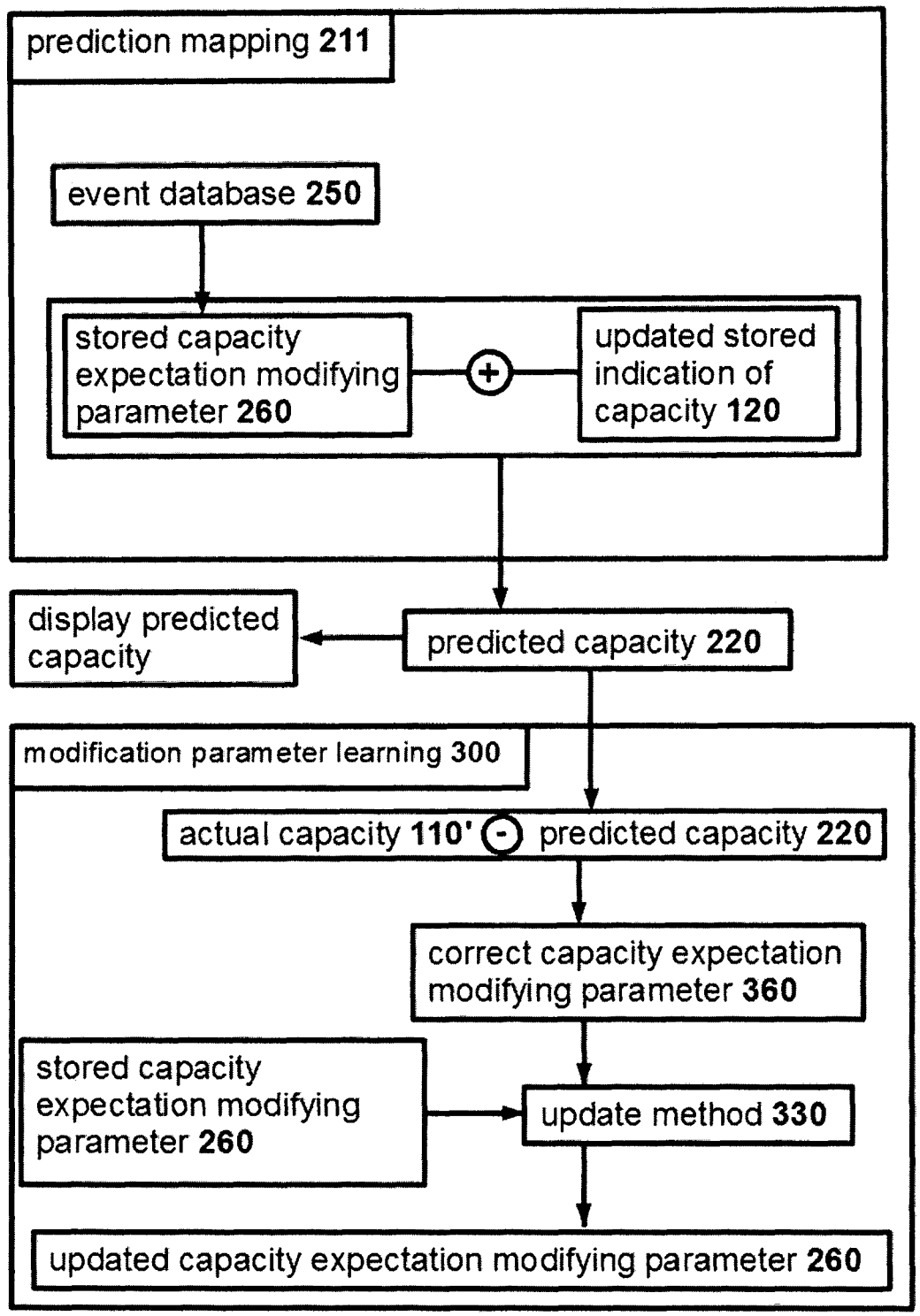
FIG. 10 illustrates the prediction mapping activity of FIG. 7, with capacity-expectation-modifying parameters allowing for traffic-relevant events.

The prediction mapping 211 is further described in conjunction with FIG. 10. The resulting predicted capacity 220 is displayed on the platform.

At timestamp "1" an update method 130 corresponding to the update method 130 described in conjunction with FIG. 5 is carried out, also resulting in an updated stored capacity indication 120. The stored capacity indications 120 are averaged along with recently obtained capacities 110' in the course of this update method 130. The capacity 110' corresponds to the minimum filling level 110, as described in conjunction with FIG. 5.

At timestamp "5" another prediction process 200 is started on the basis of the foregoing data procurement process 100.

Figure 8:
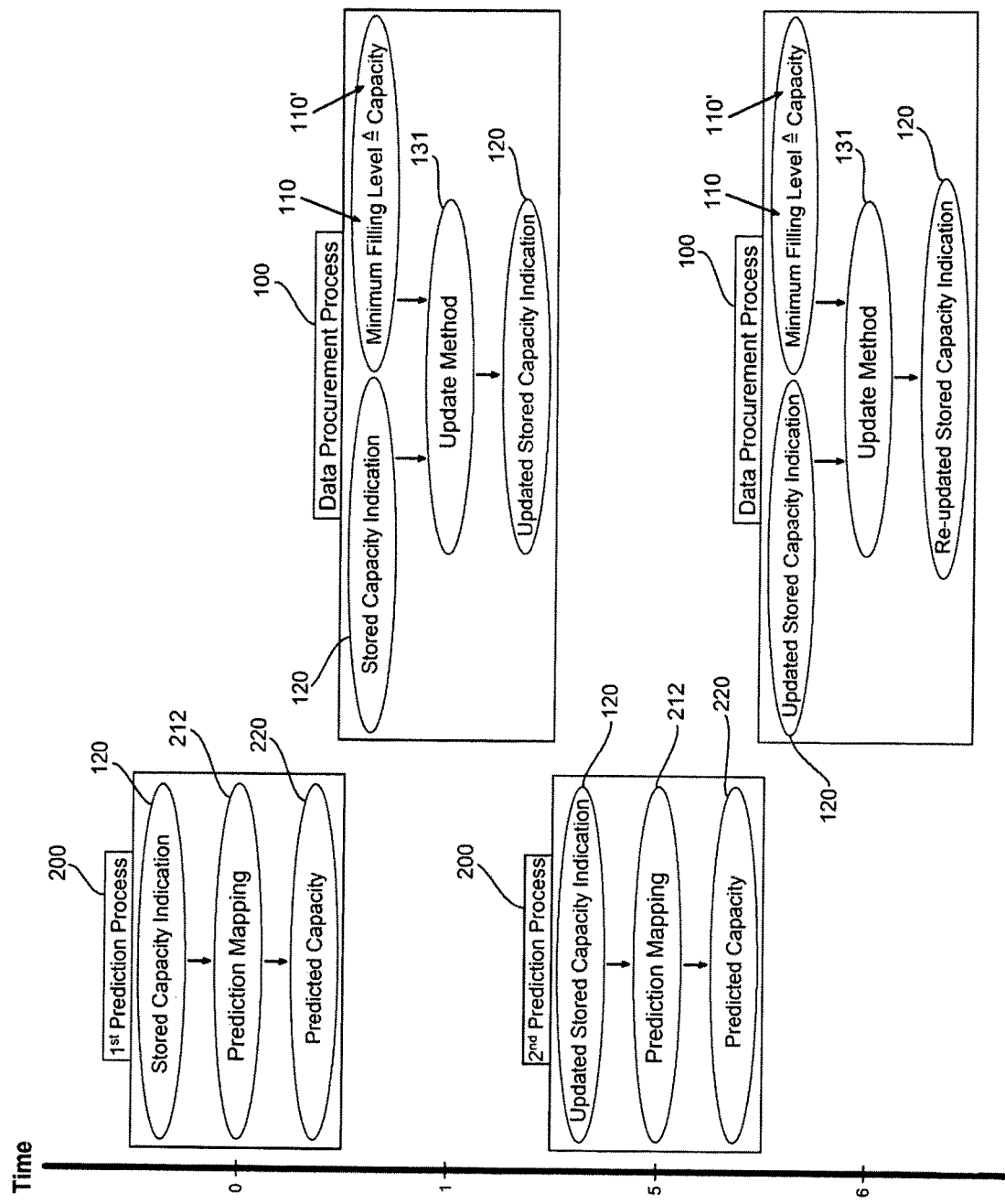
FIG. 8 illustrates an excerpt of the prediction and the data procurement processes, evaluating data during the prediction and also taking short term influences on passenger flows into account.

Another excerpt of both an exemplary prediction process 200 and exemplary data procurement process 100 is shown in FIG. 8, also showing a prediction within a short time frame. The data procurement process 100 of FIG. 8 is the same as the data procurement process shown and described in conjunction with FIG. 6.

The prediction process 200 of FIG. 8 differs from its counterpart shown in FIG. 6 by using a different prediction mapping 212. The prediction mapping 212 of FIG. 8, further described in conjunction with and shown in FIG. 11, comprises capacity-expectation-modifying parameters 260 (not shown in FIG. 8) in addition to the prediction mapping 210 of FIG. 6. As described in conjunction with FIG. 7 those capacity-expectation-modifying parameters are used to respond to traffic relevant events. Those parameters are used to modify the update method 130', comprised in the prediction mapping 212, as shown in and described in conjunction with FIG. 11.

Hence, an update method 130', corresponding to a data evaluation, as well as capacity-expectation-modifying parameters 260 are applied in the course of the prediction mapping 212 of FIG. 8. This also includes changing the update method 130' itself by the capacity-expectation-modifying parameters 260. The update method 131 of the data procurement process 100 of FIG. 8 comprises including newly acquired capacities 110' into a dataset but does not carry out any further data evaluation.

Nevertheless, the embodiments of FIGS. 6, 7, and 8 are not limited to executions within these short time frames but can also be used for predictions for more extended time frames.

The prediction mapping 210 shown in FIG. 9 comprises updating a stored indication of capacity 220, for example, by using one of the several averaging methods previously described, to obtain an updated stored indication of capacity 120. This updating is carried out by the update method 130'.

The prediction mapping 210 of FIG. 9 is based on an embodiment of the invention, wherein the update method 131 described in conjunction with FIG. 6 comprises including a recently obtained minimum filling level 110 into the dataset corresponding to the stored capacity indication 120.

If traffic-relevant events are detected in an event database 250 by the method and/or the computerized system claimed herein, stored capacity-expectation-modifying parameters 260 corresponding to the traffic-relevant event at hand are used in the prediction mapping 211 to compensate for the influence of these events on the updated stored indication of capacity 120, i.e. the expected capacity of the public-transport vehicle for passengers to board at the stop 220.

In the exemplary embodiment illustrated by FIG. 10, a capacity-expectation-modifying parameter 260 relating to public events, such as a football match is used. This capacity-expectation-modifying parameter 260 is combined with an updated stored indication of capacity 120 obtained from the data procurement process 100, to determine the predicted capacity of the public-transport vehicle for passengers to board at the stop 220. The capacity-expectation-modifying parameter 260 of the exemplary embodiment illustrated by FIG. 10 is added to the updated stored indication of capacity 120. By compensating for these traffic-relevant events, a predicted capacity 220 of the public-transport vehicle 1 is obtained and subsequently displayed on display devices 50 and/or remote computer devices 60 (not shown in FIG. 10).

In the exemplary embodiment illustrated by FIG. 10 the capacity-expectation-modifying parameter 260 is also learned. The predicted capacity 220 is compared with the actual capacity of the public-transport vehicle at the stop 110', which is measured at the stop, in a modification parameter learning process 300. In this particular embodiment the predicted capacity 220, which results from the combination of the updated stored indication of capacity 120 and the stored capacity-expectation-modifying parameter 260, is subtracted from the actual capacity 110' measured at the stop by the measuring devices 3.

In this way the deviation between the predicted capacity 220 and the actual capacity 110' is determined. This deviation value is used to ascertain the correct capacity-expectation-modifying parameter 360, i.e. the capacity-expectation-modifying parameter 260 that would have resulted in an accurate prediction of the capacity of the public-transport vehicle for passengers to board at the stop 220 when combined with the updated stored indication of capacity 120. Thereupon, the stored capacity-expectation-modifying parameter 260 is combined with this new capacity-expectation-modifying parameter 360 in an update method 330, the result of which, i.e. an updated capacity-expectation-modifying parameter 260, is stored and is to be used in future prediction mappings 211.

Figure 11:
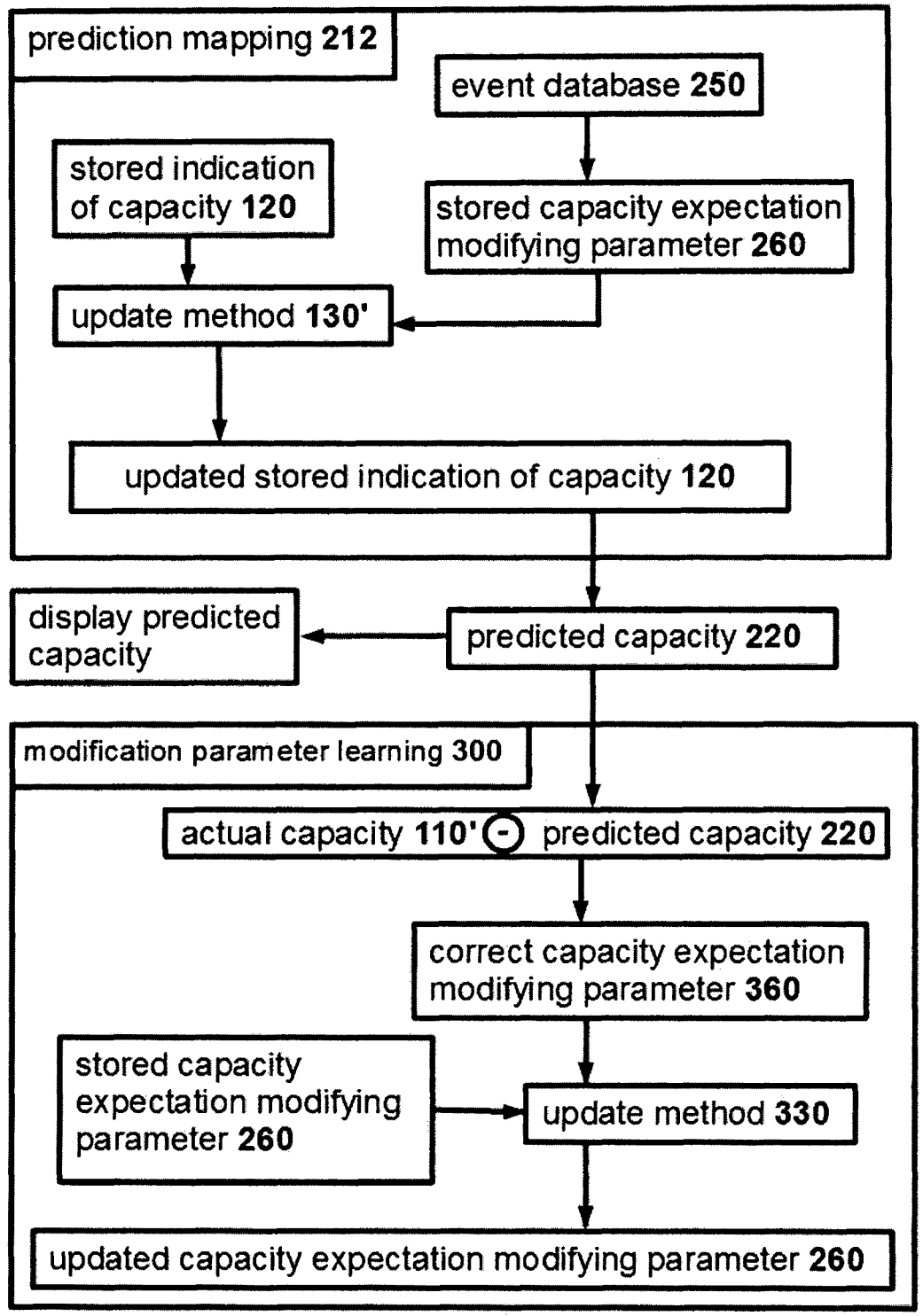
FIG. 11 illustrates the prediction mapping activity of FIG. 8, with capacity-expectation-modifying parameters allowing for traffic-relevant events and averaging of input data.

The prediction mapping 212, shown in FIG. 11, a combination of the prediction mapping 210 of FIG. 9 and prediction mapping 211 of FIG. 10. Namely, prediction mapping 212 comprises averaging a stored indication of capacity 120 in the course of an update method 130', wherein the update method 130' is modified by a capacity-expectation modifying parameter 260 in order to take the influence of a traffic-relevant event, for example, a football match, into account. Coefficients of capacities which are summed up in a moving average, used in the update method 130', are, for example, increased as capacities that were obtained, when the influence of the football match on traffic was already present, are weighted stronger than capacities obtained when this influence was not present.

The capacity-expectation-modifying parameter 260 can also be learned in a modification parameter learning process 300 in analogy to the method described in conjunction with FIG. 10.

Figure 12:
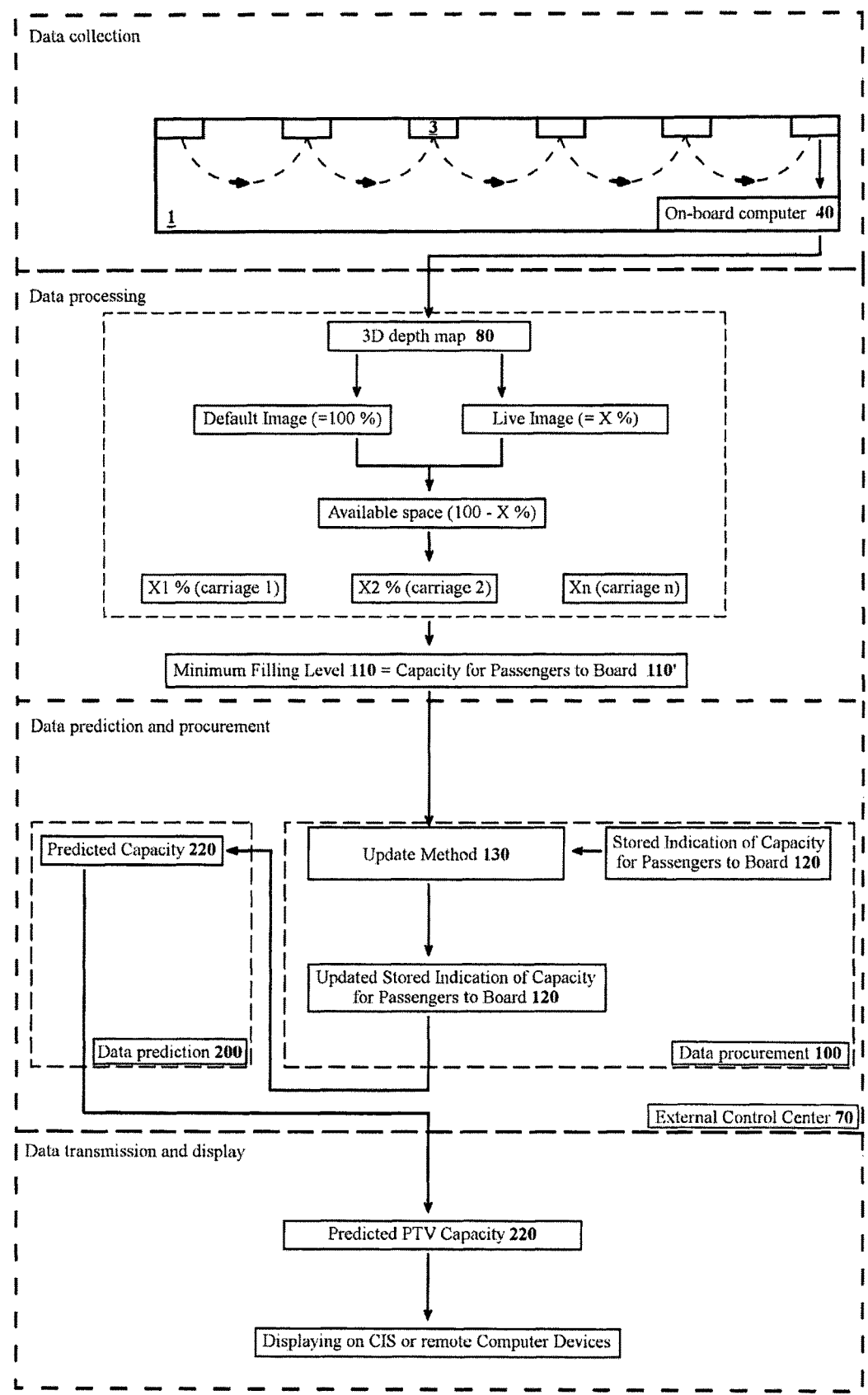
FIG. 12 shows a method of predicting a capacity of a PTV using previously obtained minimum-filling levels.

A flow-chart depicting activities carried out by an embodiment of the invention from an initial collection of data to a final display of the predicted capacity for passengers to board at a stop 220 is illustrated by FIG. 12. During the data collection, a section of the public-transport vehicle (PTV) 1, is scanned with measuring devices 3 in a successive order, at the moment in which a minimum filling level condition is identified, as described in conjunction with FIG. 2 and FIG. 4. The chronological order in which the measuring devices 3 are actuated is indicated by dashed arrows in the form of an arc spreading from one measuring device 3 to another. Raw data recorded by the measuring devices 3 during the successive scans is transmitted to an on-board computer 40. This on-board computer 40 further processes the raw data during a data processing activity.

Thereby a 3D depth map 80 of the section of the public-transport vehicle 1 during a minimum filling level condition at the stop is calculated. The passenger space 4 and the luggage space 5 of the public-transport vehicle 1 are identified during the creation of the 3D depth map 80 by software executed on the on-board computer 40. The 3D depth map 80 of the section of the public-transport vehicle 1 without passengers 6 and/or luggage 7, i.e. the blank scan, has been created by a previous scan as described in conjunction with FIG. 1 and FIG. 3. This blank scan is subtracted from the 3D depth map 80 of the section obtained during the minimum-filling-level condition. More specifically, the depth map 80 of the empty public-transport vehicle 1, corresponding to a capacity of 100% and referred to as "Default Image" in the flow chart illustrated by FIG. 12, is subtracted from the current depth map 80, referred to as "Live Image" in the flow chart illustrated by FIG. 12. The resulting difference image is indicative of the filling level of the public-transport vehicle. The capacity (=the remaining capacity for passengers to board the public-transport vehicle at the stop; also referred to as the "Available space") corresponds to the maximum capacity (100%) minus the filling level of the PTV (X %).

Thereby an indication representative of the capacity of the public-transport vehicle for passengers to board at the stop 120 for a given section is created, for each section individually. This indication representative of the capacity for passengers to board the public-transport vehicle at the stop 120 for a given section is a percentage of the maximum capacity of the section of the public-transport vehicle 1. This indication is referred to as "Available space" in the flow chart illustrated by FIG. 12.

The data collection and data processing activities are carried out for each section of the public-transport vehicle 1. The measured minimum filling level of each section of the public-transport vehicle at the stop 110 is further used in a subsequent "prediction and procurement" activity. This activity comprises the data procurement process 100 (referred to as "Data procurement" in the flow chart illustrated by FIG. 12) and the prediction process 200 (referred to as "Data prediction" in the flow chart illustrated by FIG. 12). In the data procurement process 100 the measured actual capacity of the public-transport vehicle for passengers to board 110', corresponding to the measured minimum filling level 110 is averaged in the update method 130 along with previously stored indications of the capacity for passengers to board 120 resulting from previous data collection activities and data processing activities. The averaging of these previously obtained capacities for passengers to board at the stop 120 along with the measured capacity for passengers to board at the stop 110' results in an updated stored indication of the capacity for passengers to board 120.

Figure 16:
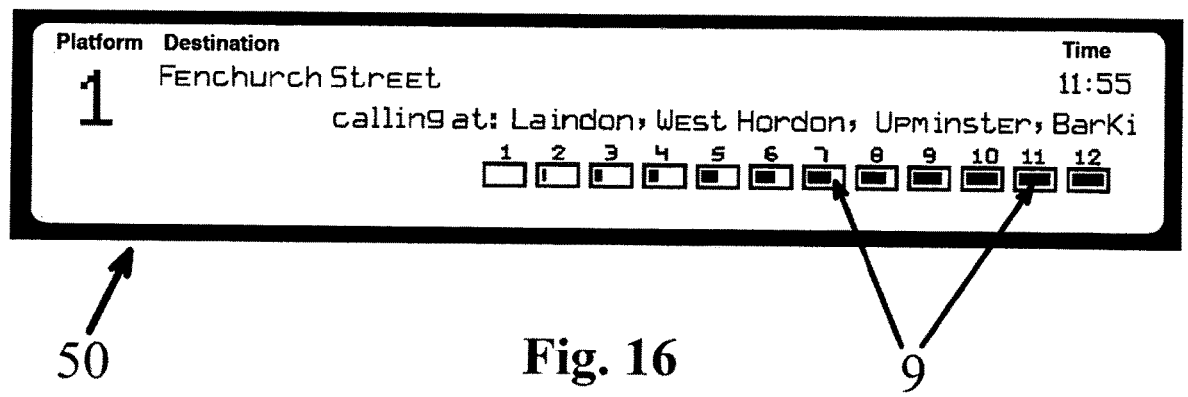
FIG. 16 shows a customer information screen (CIS), displaying predicted capacity information.

This quantity is further processed in a prediction process 200, wherein the updated stored indication of the capacity for passengers to board 120 is transformed into a desired format for displaying the information to passengers 6. Such a desired format is, for example, a bar diagram, as illustrated by FIG. 16. The prediction process 200 and data procurement process 100 are carried out by using at least one computer device in an external control center 70. The predicted capacity 220, is subsequently displayed on customer information screens 50, or transmitted to at least one remote computer device 60 during a data transmission and display activity. Correspondingly, by performing the activities described above a free capacity for luggage 7 can also be measured, learned, predicted and displayed.

Figure 13:
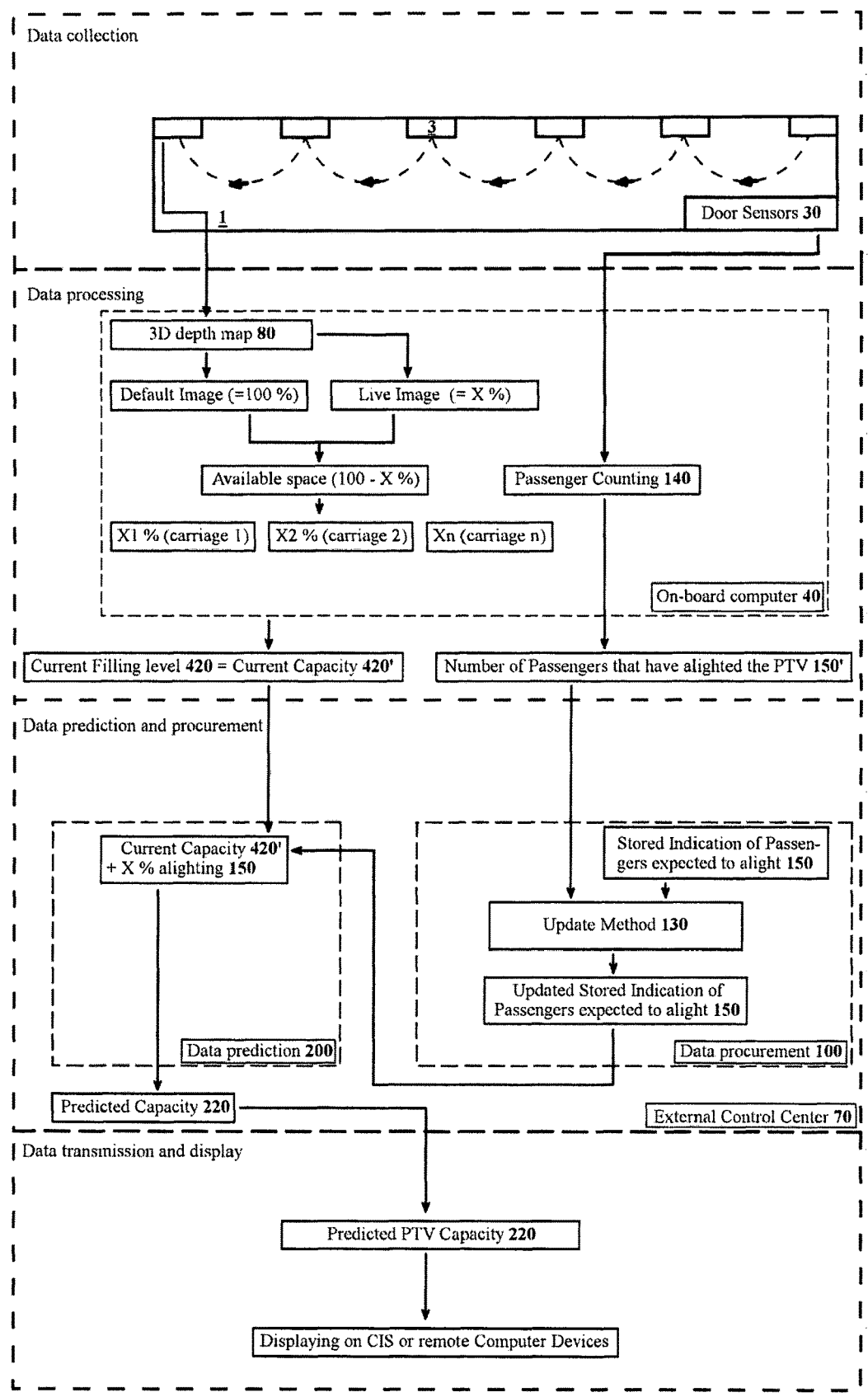
FIG. 13 shows a method of predicting a capacity of a PTV using a combination of current capacity information and stored alighting passenger information.

A flow-chart depicting activities carried out by another embodiment of the invention is illustrated by FIG. 13. During the data collection activity the section of the public-transport vehicle (PTV) 1 is scanned while approaching an upcoming stop. The scan is carried out with measuring devices 3 as described in conjunction with FIG. 12. Raw data recorded by the measuring devices 3 during the scan is transmitted to an on-board computer 40.

In addition to the embodiment illustrated by FIG. 12, the section of the public-transport vehicle 1, depicted in FIG. 13 is equipped with door sensors 30. The doors sensors 30 may be identical to the measuring devices 3, but further equipped with motion tracking software in order to differentiate between boarding and alighting passengers 6 at the doors, or photoelectric barriers as already mentioned in the "general description". Therefore, during the data collection activity there are two output signals, which are further processed during the data processing activity by an on-board computer 40, namely raw data of the sensors reconstructable to a 3D depth map 80 of the section of the public-transport vehicle 1 and data resulting from passenger counting 140, corresponding to the number of passengers that have alighted from the corresponding section of the public transport vehicle at the stop 150'.

Subsequently, the 3D depth map 80 of the public transport vehicle 1 approaching the upcoming stop is created by processing the raw data. As described in conjunction with FIG. 12, which pertains to the determination of the minimum filling level 110, a current filling level 420 is subtracted from the maximum capacity of the section of the public-transport vehicle 1. Thereby, a current capacity for passengers to board 420' is obtained. The current filling level 420 is determined on the basis of the 3D depth map 80 obtained and a blank scan of the section. Hence, two output values are obtained by the data processing activity: a current filling level of a section 420 (and thereby the current capacity of passengers to board the section 420', determined before the upcoming stop) and the number of passengers that have alighted from the corresponding section of the public-transport vehicle at the stop 150' in the past.

In the data procurement process 100 the number of passengers that have alighted from a section of the public transport vehicle at the stop 150' in the past, is averaged in an update method 130 along with stored indications of passengers that are expected to alight from the section of the public-transport vehicle at the stop 150, i.e. previously measured numbers of passengers that have alighted at the stop 150' processed in previous data procurement processes 100. This update method 130 results in an updated stored indication of the number of passengers expected to alight at the stop 150.

A capacity, which corresponds to the updated stored indication of the number of passengers expected to alight at the stop 150 is added to the current capacity for passengers to board 420', in the course of the prediction process 200. As a consequence a predicted capacity for passengers to board at the stop 220 is determined. As described in conjunction with FIG. 12, the predicted capacity for passengers to board at the stop 220 is displayed on stationary display devices 50 and/or transmitted to at least one remote computer device 60.

As for the embodiment described in conjunction with FIG. 12, by performing the activities described above a free capacity for luggage 7 can also be measured, learned, predicted and displayed.

Figure 14:
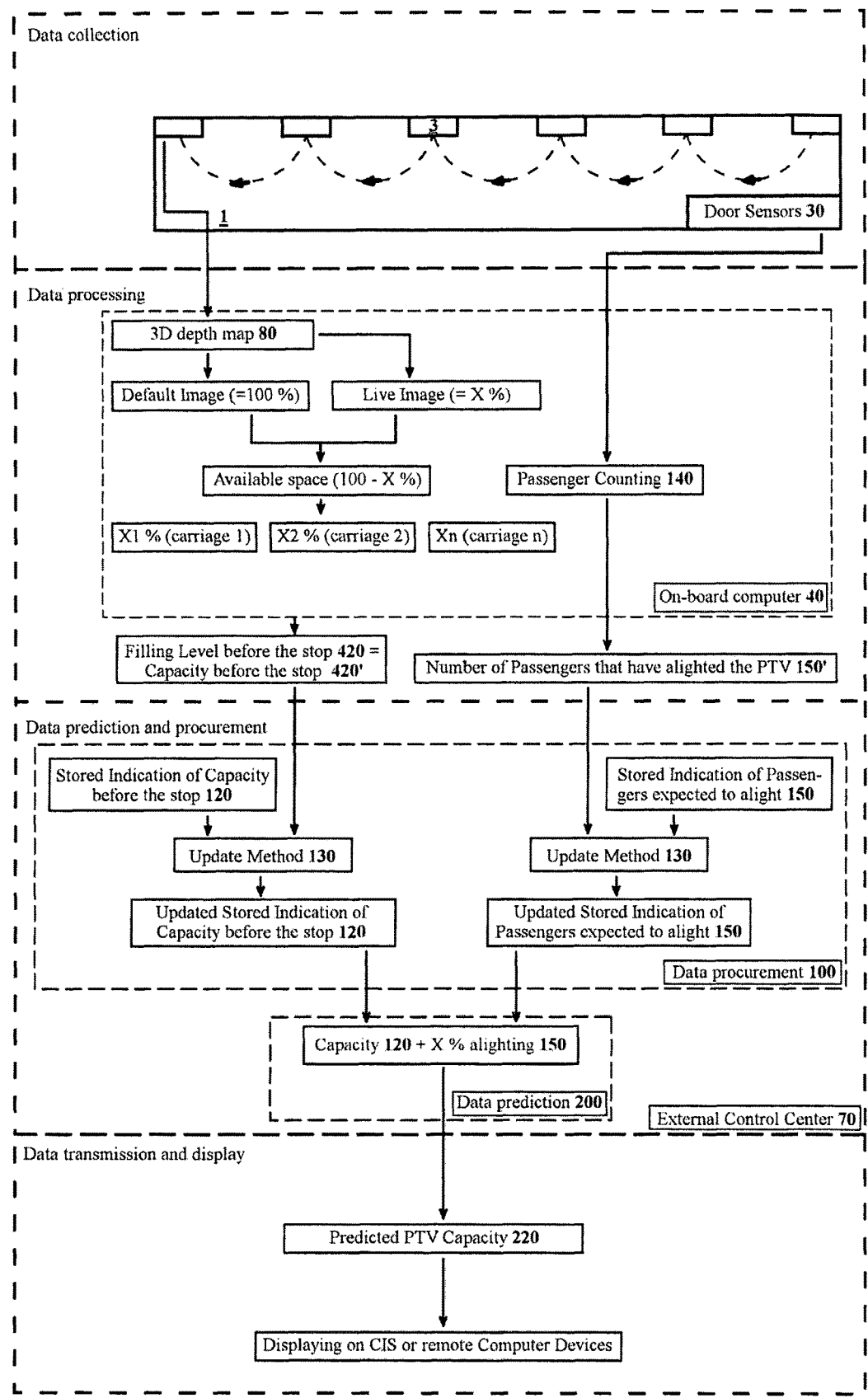
FIG. 14 shows a method of predicting a capacity of a PTV using a combination of stored capacity information and stored alighting passenger information.

A flow-chart depicting activities carried out by another embodiment of the invention is illustrated by FIG. 14. The data collection activity of FIG. 14 corresponds to the data collection activity of FIG. 13. The section of the public-transport vehicle (PTV) 1 is scanned before the stop with measuring devices 3 and alighting passengers are counted by doors sensors 30 at the stop.

However, the measured filling levels 420 are not used for a current prediction for the capacity of the public-transport vehicle at the stop 220, but are stored like the numbers of passengers that have alighted from the public-transport vehicle 150' and are used in future prediction processes 200.

As described in conjunction with FIGS. 12 and 13, the data prediction and procurement activity comprises a data procurement process 100 and a prediction process 200. The updated stored indication of the number of passengers expected to alight at the stop 150 is obtained during the data procurement process 100 as described in conjunction with FIG. 13.

During the data procurement process 100, the most recently measured capacity before the stop 420' is combined and averaged with the stored indication of the capacity before the stop 120 in an update method 130, analogous to the update method 130 used for obtaining the updated stored indication of passengers expected to alight 150.

The updated stored indication of the capacity for passengers to board before the stop 120 and the updated stored indication of passengers expected to alight 150 are combined, resulting in the predicted capacity of the public-transport vehicle at the stop 220. The capacity, which corresponds to the updated stored indication of the number of passengers expected to alight at the stop 150 is added to the updated stored indication of the capacity for passengers to board the public-transport vehicle before the stop 120.

As a consequence a predicted capacity for passengers to board at the stop 220 is determined. As described in conjunction with FIG. 12 and FIG. 13, the predicted capacity for passengers to board at the stop 220 is displayed on stationary display devices 50 and/or transmitted to at least one remote computer device 60.

As for the embodiment described in conjunction with FIGS. 12 and 13, by performing the activities described above, a free capacity for luggage 7 can be measured, learned, predicted and displayed.

Figure 15:
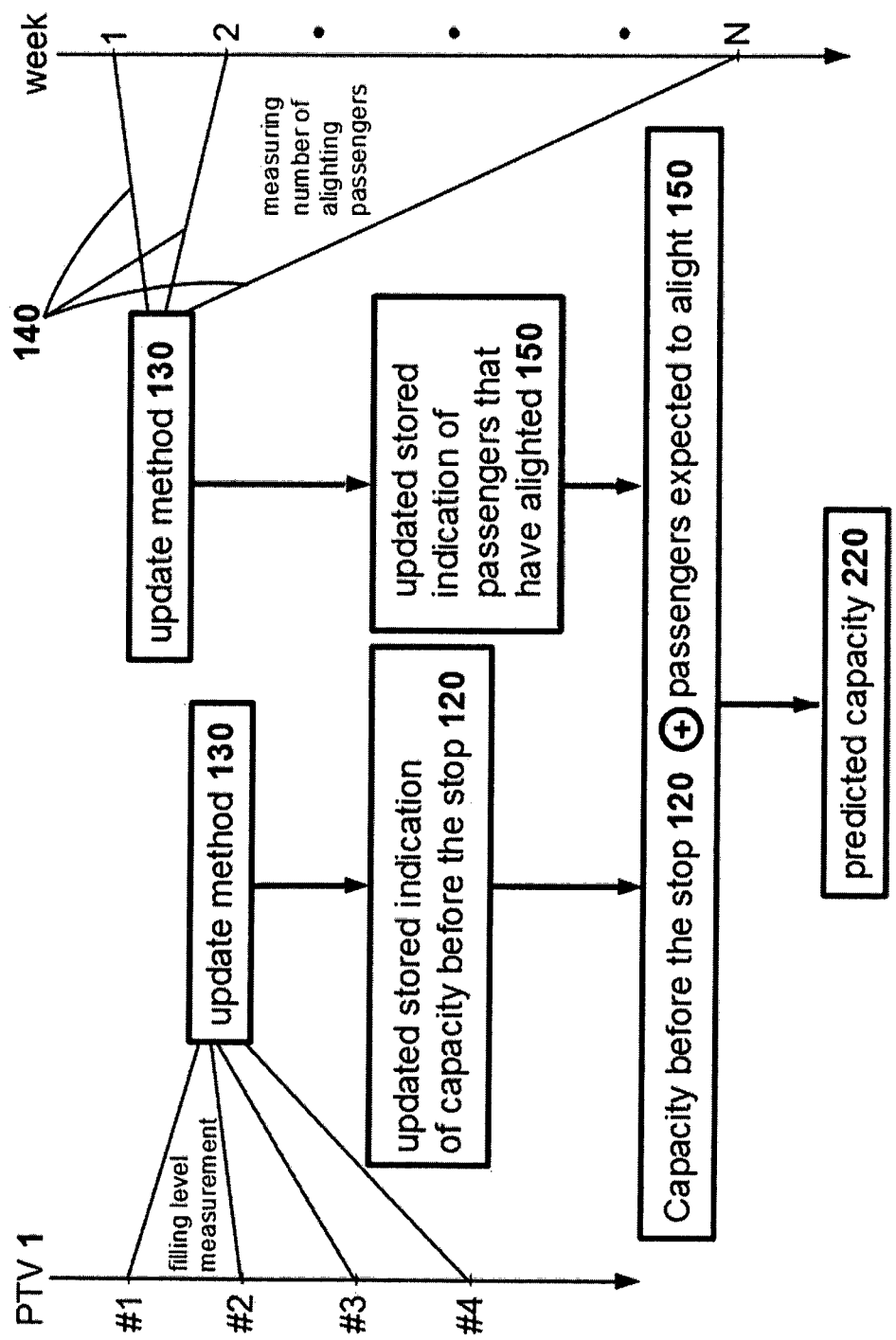
FIG. 15 illustrates gathering of capacity information and alighting passenger information from different time frames and combining the information to a predicted capacity.

The measured filling levels before the stop 420 of previous rides (shown in FIGS. 13 and 14) as well as the measured numbers of passengers that have alighted from the public-transport vehicle at the stop 150' (shown in FIGS. 13 and 14) are averaged within an update method 130. The activity of "measuring of the number of the number passengers that have alighted . . . " is labeled as "140" in the figures. In the embodiment of FIG. 15, measured filling levels before the stop 420 of subsequent public-transport vehicles 1, corresponding to capacities of these public-transport vehicles for passengers to board at the stop 420', are averaged (short-term averaging) on the one hand to become stored indications of capacities before the stop 120 and measured numbers of alighting passengers of public-transport vehicles 150' of a timespan of several weeks are averaged (long-term averaging) on the other hand, thus they become stored indications of passengers that have alighted 150.

For predicting the capacity of the public-transport vehicle for passengers to board at the stop 220, the capacity corresponding to the indication of the number of passengers expected to alight at the stop 150, resulting from an update method 130 (long-term averaging mentioned above) is added to the stored indication of the capacity of the public-transport vehicle before the stop 120 that is also a result of an update method 130 (short-term averaging mentioned above). The result of this addition yields the predicted capacity 220.

Indicators 9, for example in the form of bars in horizontal direction representing the predicted capacity for passengers to board at the stop 220, are displayed on a Customer Information Screen (CIS) 50, as illustrated by FIG. 16. The exemplary public-transport vehicle 1, for which the predicted capacity at the stop 220 is displayed section-wise on the CIS 50, has twelve sections. Each indicator 9 stands for the predicted capacity of the respective section of the public-transport vehicle for passengers to board at the stop 220.

Figure 17:
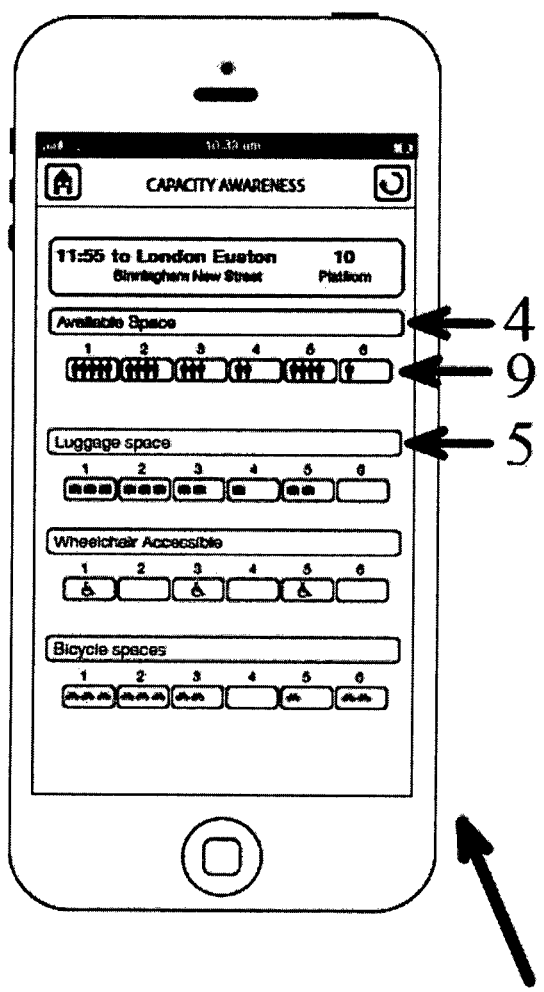
FIG. 17 shows a remote computer device, displaying predicted capacity information.

A remote computer device 60, in the form of a smartphone, displaying the information about available space in the passenger space 4, i.e. the capacity for passengers to board 220, by a filling level indication, wherein the indicators 9, here humanoid shapes, is illustrated by FIG. 17. Similarly, available space for luggage 7 is displayed by a filling level indication, wherein the indicators are suitcase shaped. Also the available space for other travel and mobility accessories, such as wheelchairs (indicated by wheelchair-shaped indicators) and bicycles (indicated by bicycle shaped indicators), is displayed.

Figure 18:
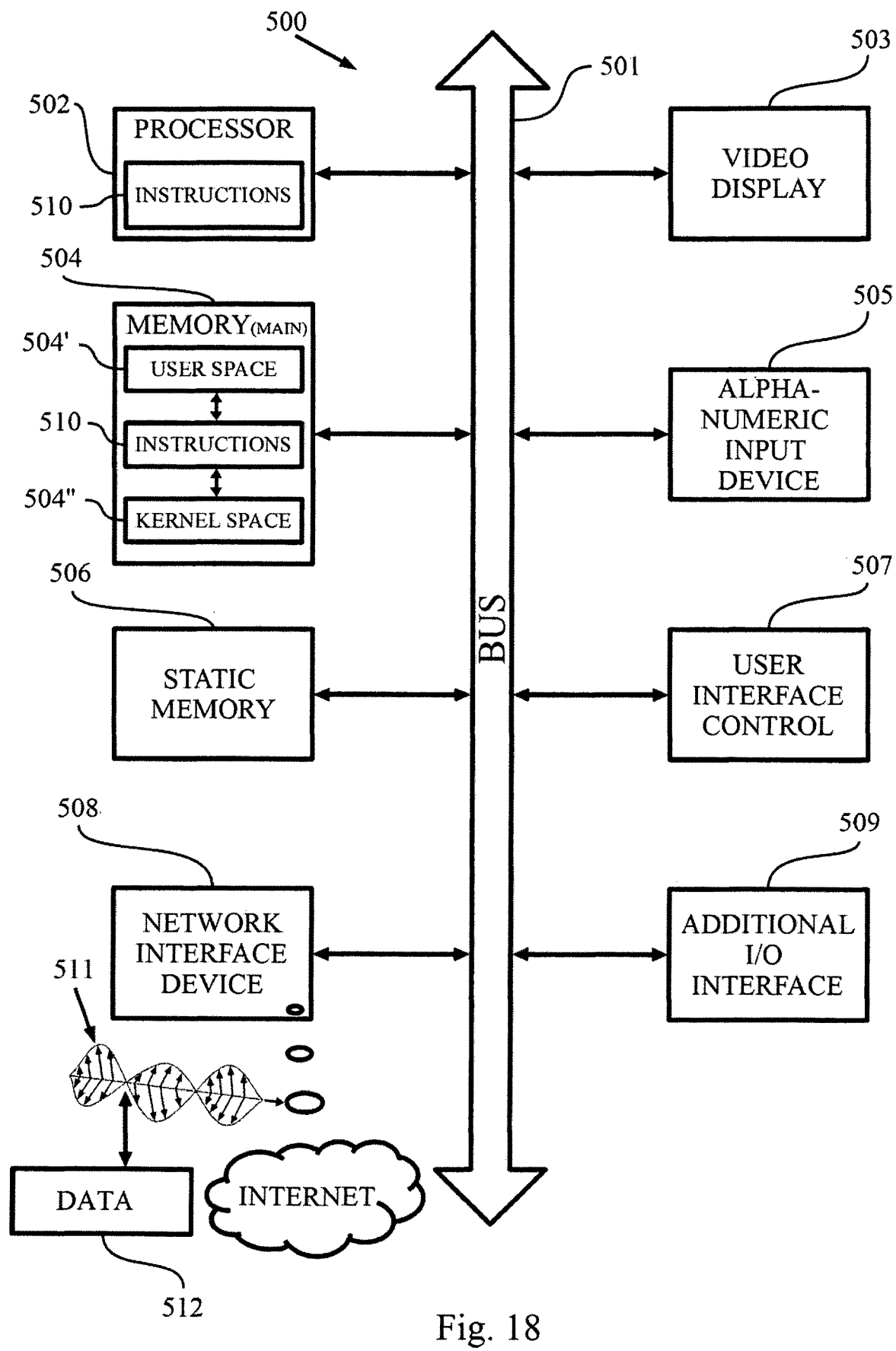
FIG. 18 shows an exemplary computer system, according to the computerized system described herein, arranged to predict the capacity of the public transport vehicle.

A diagrammatic representation of an exemplary computer system 500 is shown in FIG. 18. The computer system 500 is arranged to execute a set of instructions 510, to cause the computer system 500 to perform any of the methodologies used for predicting a capacity of a public-transport vehicle for passengers to board at a stop 220 and for displaying information representative of this capacity 220 on at least one stationary display device 50 at the stop and/or enabling data representative of the capacity of the public-transport vehicle for passengers to board at the stop 220 to be transmitted to at least one remote computer device 60, as described herein. The at least one on-board computer 40 and the at least one computer in the external control center 70 are, for example, such a computer system 500.

The computer system 500 includes a processor 502, a main memory 504 and a network interface 508. The main memory 504 includes a user space 504', which is associated with user-run applications, and a kernel space 504", which is reserved for operating-system- and hardware-associated applications. The computer system 500 further includes a static memory 506, e.g. non-removable flash and/or solid state drive and/or a removable Micro or Mini SD card, which permanently stores software enabling the computer system 500 to execute functions of the computer system 500. Furthermore, it may include a video display 503, a user interface control module 507 and/or an alpha-numeric and cursor input device 505. Optionally, additional I/O interfaces 509, such as card reader and USB interfaces may be present. The computer system components 502 to 509 are interconnected by a data bus 501.

In some exemplary embodiments the software programmed to carry out the method described herein is stored on the static memory 506; in other exemplary embodiments external databases are used. The 3D-depth maps or passenger counts recorded by the sensors are, for example, processed by the at least one on-board computer 40 (data procurement process 100) and this data 512 obtained in the data procurement process 100 is transmitted over a propagated waveform 511 via the network interface device 508 to the external control center 70 to carry out the prediction process 200 on the basis of this transmitted data 512 and previously stored data.

An executable set of instructions (i.e. software) 510 embodying any one, or all, of the methodologies described above, resides completely, or at least partially, permanently in the non-volatile memory 506. When being executed, process data resides in the main memory 504 and/or the processor 502.

The invention claimed is:

1. A method of predicting a capacity of a public-transport vehicle for passengers to board at a stop and for at least one of (i) displaying information representative of the predicted capacity on at least one stationary display device at the stop and (ii) enabling data representative of the predicted capacity to be transmitted to at least one remote computer device, the method comprising an automatic prediction process and an automatic data procurement process;

the prediction process comprising:
measuring a filling level of the public-transport vehicle before the stop when the public-transport vehicle is approaching the stop, wherein measuring the filling level comprises directly determining the filling level using a closed-circuit television camera, and combining the measured filling level with a stored indication of a number of passengers expected to alight from the public-transport vehicle at the stop to thereby predict the capacity of the public transport vehicle for passengers to board at the stop, wherein the stored indication is the result of at least one previous execution of the data procurement process, at least one of (i) displaying the information representative of the predicted capacity on the at least one stationary display device at the stop and (ii) enabling data representative of the predicted capacity to be transmitted to the at least one remote computer device;

the data procurement process comprising:
determining the number of passengers that have alighted from the public-transport vehicle at the stop;
updating the stored indication of the number of passengers expected to alight from the public-transport vehicle at the stop to be used in the future, wherein at least one of (i) the prediction process and (ii) the data procurement process are adapted to take into account traffic relevant events by using at least one capacity-expectation-modifying parameter, wherein the at least one capacity expectation-modifying parameter is determined, stored, and updated in a learning process for the at least one capacity expectation-modifying parameter, wherein in this learning process the at least one capacity expectation-modifying parameter is updated to provide the accurate capacity of the public transport vehicle for passengers to board by comparing measured numbers of passengers that have alighted from the public-transport vehicle with the predicted number of passengers that have alighted and comparing the actual determined capacity of the public-transport vehicle for passengers to board with the predicted capacity of the public transport vehicle, wherein the public-transport vehicle has a passenger space, and wherein the measuring comprises scanning the passenger space with at least one measuring device sensitive to the presence of passengers, and wherein raw data recorded by the at least one measuring device during the scan is transmitted to an on-board computer.

2. The method of claim 1, wherein the capacity of the public-transport vehicle for passengers to board at the stop is determined by at least one of (i) measuring a minimum filling level at the stop and subtracting the minimum-filling-level from a maximum capacity of the public-transport vehicle and (ii) subtracting an expected minimum filling level obtained from stored measured minimum-filling levels from the maximum capacity of the public-transport vehicle.

3. The method of claim 1, wherein the capacity of the public-transport vehicle for passengers to board is determined by subtracting the number of passenger expected to alight from the measured filling level.

4. The method of claim 1, wherein the prediction process is adapted to take into account the respective capacities of a given number of previous public-transport vehicles for passengers to board at the stop.

5. The method of claim 1, wherein the public-transport vehicle is subdivided into a plurality of sections, and the filling level of the public-transport vehicle comprises filling levels for the sections of the public-transport vehicle.

6. The method of claim 5, wherein a plurality of measuring devices is equipped with at least one infrared emitter to create at least one of (i) infrared point clouds and (ii)

structured infrared patterns, and the plurality of measuring devices is also equipped with at least one infrared detector to receive at least one of (i) infrared point clouds and (ii) structured infrared patterns, the at least one of (i) infrared point clouds and (ii) structured infrared patterns being used to create 3D depth maps of at least one of (i) various sections of the public-transport vehicle's passenger space and (ii) luggage space, which are stitched together to form a 3D depth map of the public transport vehicle.

7. The method of claim 1, wherein the public-transport vehicle has a luggage space, and the method further comprises (i) scanning the luggage space with at least one measuring device sensitive to the presence of luggage, and (ii) predicting and displaying an amount of luggage that can be stored in the luggage space.

8. The method of claim 7, wherein the filling level is measured by a background-subtraction method in which a result of a scan of the public-transport vehicle with at least one of (i) passengers and (ii) luggage before the stop is corrected by a result of a scan without at least one of (i) passengers and (ii) luggage.

9. The method of claim 8, wherein at least one of the passenger space and the luggage space of the public-transport vehicle is defined by at least one of (i) physical markers in the public-transport vehicle that are detectable by the at least one measuring device during the scan of the public-transport vehicle without at least one of passengers and luggage, and (ii) by post-editing the scan of the public-transport vehicle without at least one of passengers and luggage.

10. A computerized system for predicting a capacity of a public-transport vehicle for passengers to board at a stop and for at least one of (i) displaying information representative of the predicted capacity on at least one stationary display device at the stop and (ii) enabling data representative of the predicted capacity of the public-transport vehicle for passengers to board at the stop to be transmitted to at least one remote computer device, the system comprising at least one processor and at least one memory, the at least one memory comprising executable instructions that when executed by the processor cause the at least one processor to perform an automatic prediction process and an automatic data procurement process;

the prediction process comprising:
measuring a filling level of the public-transport vehicle before the stop when the public-transport vehicle is approaching the stop, wherein measuring the filling level comprises directly determining the filling level using a closed-circuit television camera, and combining the measured filling level with a stored indication of a number of passengers expected to alight from the public-transport vehicle at the stop to thereby predict the capacity of the public transport vehicle for passengers to board at the stop, wherein the stored indication is the result of at least one previous execution of the data procurement process,
at least one of (i) displaying the information representative of the predicted capacity on the at least one stationary display device at the stop and (ii) enabling data representative of the predicted capacity to be transmitted to the at least one remote computer device;

the data procurement process comprising:
determining the number of passengers that have alighted from the public-transport vehicle at the stop;
updating the stored indication of the number of passengers expected to alight from the public-transport vehicle at the stop to be used in the future, wherein at least one of (i) the prediction process and (ii) the data procurement process are adapted to take into account traffic relevant events by using at least one capacity-expectation-modifying parameter, wherein the at least one capacity expectation-modifying parameter is determined, stored, and updated in a learning process for the at least one capacity expectation-modifying parameter, wherein in this learning process the at least one capacity expectation-modifying parameter is updated to provide the accurate capacity of the public transport vehicle for passengers to board by comparing measured numbers of passengers that have alighted from the public-transport vehicle with the predicted number of passengers that have alighted and comparing the actual determined capacity of the public-transport vehicle for passengers to board with the predicted capacity of the public transport vehicle, wherein the public-transport vehicle has a passenger space, and wherein the measuring comprises scanning the passenger space with at least one measuring device sensitive to the presence of passengers, and wherein raw data recorded by the at least one measuring device during the scan is transmitted to an on-board computer.

11. A method of predicting a capacity of a public-transport vehicle for passengers to board at a stop and for at least one of (i) displaying information representative of the predicted capacity on at least one stationary display device at the stop and (ii) enabling data representative of the predicted capacity to be transmitted to at least one remote computer device, the public-transport vehicle comprising at least one passenger space with at least one measuring device sensitive to the presence of passengers, the method comprising an automatic prediction process and an automatic data procurement process;

wherein the prediction process comprises:
predicting the capacity of the public-transport vehicle for passengers to board at the stop by using a stored indication of the capacity of the public-transport vehicle for passengers to board at the stop, wherein the stored indication is the result of at least one previous execution of the data procurement process,
at least one of (i) displaying the information representative of the predicted capacity on the at least one stationary display device at the stop and (ii) enabling data representative of the predicted capacity to be transmitted to the at least one remote computer device;

wherein the data procurement process comprises:
determining the capacity of the public-transport vehicle for passengers to board at the stop by at least one of (i) scanning the at least one passenger space with the at least one measuring device, wherein the measuring device is a closed-circuit television camera, when the vehicle is at the stop, and (ii) measuring a filling level of the public-transport vehicle before the stop by scanning the at least one passenger space with the at least one measuring device before the stop and combining the filling level with an indication of a number of alighting passengers;

updating the stored indication of the capacity of the public-transport vehicle for passengers to board at the stop to be used in the future, wherein at least one of (i) the prediction process and (ii) the data procurement process are adapted to take into account traffic relevant events by using at least one capacity-expectation-modifying parameter, wherein the at least one capacity expectation-modifying parameter is determined, stored, and updated in a learning process for the at least one capacity expectation-modifying parameter, wherein in this learning process the at least one capacity expectation-modifying parameter is updated to provide the accurate capacity of the public transport vehicle for passengers to board by comparing measured numbers of passengers that have alighted from the public-transport vehicle with the predicted number of passengers that have alighted and comparing the actual determined capacity of the public-transport vehicle for passengers to board with the predicted capacity of the public transport vehicle, wherein the public-transport vehicle has a passenger space, and wherein the measuring comprises scanning the passenger space with at least one measuring device sensitive to the presence of passengers, and wherein raw data recorded by the at least one measuring device during the scan is transmitted to an on-board computer.

12. The method of claim 11, wherein the capacity of the public-transport vehicle for passengers to board is determined by subtracting the number of alighting passengers from the measured filling level.

13. The method of claim 11, wherein the prediction process is adapted to take the respective capacities of a given number of previous public-transport vehicles for passengers to board at the stop into account.

14. The method of claim 11, wherein the public-transport vehicle is subdivided into a plurality of sections, and the filling level of the public-transport vehicle comprises filling levels for the sections of the public-transport vehicle.

15. The method of claim 11, wherein the public-transport vehicle has a luggage space, and measuring the filling level of the public-transport vehicle comprises scanning the luggage space with at least one measuring device sensitive to the presence of luggage, wherein the method further comprises predicting and displaying an amount of luggage that can be stored in the luggage space.

16. The method of claim 15, wherein the filling level is measured by a background-subtraction method in which a result of a scan of the public-transport vehicle with at least one of (i) passengers and (ii) luggage before the stop is corrected by a result of a scan without at least one of (i) passengers and (ii) luggage.

17. The method of claim 16, wherein at least one of the passenger space and the luggage space of the public-transport vehicle is defined by at least one of (i) physical markers in the public-transport vehicle that are detectable by the at least one measuring device during the scan of the public-transport vehicle without at least one of passengers and luggage, and (ii) by post-editing the scan of the public-transport vehicle without at least one of passengers and luggage.

18. The method of claim 15, wherein a plurality of measuring devices is equipped with at least one infrared emitter to create at least one of (i) infrared point clouds and (ii) structured infrared patterns, and the plurality of measuring devices is also equipped with at least one infrared detector to receive at least one of (i) infrared point clouds and (ii) structured infrared patterns, the infrared point clouds and/or structured infrared patterns being used to create 3D depth maps of various sections of the public-transport vehicle's passenger space and/or luggage space, which are stitched together to form a 3D depth map of the public transport vehicle.

19. A computerized system for predicting a capacity of a public-transport vehicle for passengers to board at a stop and for at least one of (i) displaying information representative of the predicted capacity on at least one stationary display device at the stop and (ii) enabling data representative of the predicted capacity of the public-transport vehicle for passengers to board at the stop to be transmitted to at least one remote computer device, the public-transport vehicle comprising a passenger space with at least one measuring device sensitive to the presence of passengers, the system comprising at least one processor and at least one memory, the at least one memory comprising executable instructions that when executed by the at least one processor cause the processor to perform an automatic prediction process and an automatic data procurement process;

the prediction process comprising:
predicting the capacity of the public-transport vehicle for passengers to board at the stop by using a stored indication of the capacity of the public-transport vehicle for passengers to board at the stop, wherein the stored indication is the result of at least one previous execution of the data procurement process,
at least one of (i) displaying the information representative of the predicted capacity on the at least one stationary display device at the stop and (ii) enabling data representative of the predicted capacity to be transmitted to the at least one remote computer device;

the data procurement process comprising:
determining the capacity of the public-transport vehicle for passengers to board at the stop by at least one of (i) scanning the at least one passenger space with the at least one measuring device, wherein the measuring device is a closed-circuit television camera, when the vehicle is at the stop, and (ii) measuring a filling level of the public-transport vehicle before the stop by scanning the at least one passenger space with the at least one measuring device before the stop and combining the filling level with an indication of a number of alighting passengers;
updating the stored indication of the capacity of the public-transport vehicle for passengers to board at the stop to be used in the future, wherein at least one of (i) the prediction process and (ii) the data procurement process are adapted to take into account traffic relevant events by using at least one capacity-expectation-modifying parameter, wherein the at least one capacity expectation-modifying parameter is determined, stored, and updated in a learning process for the at least one capacity expectation-modifying parameter, wherein in this learning process the at least one capacity expectation-modifying parameter is updated to provide the accurate capacity of the public transport vehicle for passengers to board by comparing measured numbers of passengers that have alighted from the public-transport vehicle with the predicted number of passengers that have alighted and comparing the actual determined capacity of the public-transport vehicle for passengers to board with the predicted capacity of the public transport vehicle, and wherein raw data recorded by the at least one measuring device during the scan is transmitted to an on-board computer.

* * * * *

UNITED STATES PATENT AND TRADEMARK OFFICE
CERTIFICATE OF CORRECTION

Page 1 of 1

PATENT NO. : 11,023,809 B2
APPLICATION NO. : 15/326202
DATED : June 1, 2021
INVENTOR(S) : Gerrit Böhm It is certified that error appears in the above-identified patent and that said Letters Patent is hereby corrected as shown below:

In the Specification

Column 17, Line 27, "an interne connection" should be --an internet connection--.

Signed and Sealed this
Third Day of August, 2021

Drew Hirshfeld
*Performing the Functions and Duties of the*
*Under Secretary of Commerce for Intellectual Property and*
*Director of the United States Patent and Trademark Office*